United States Patent
Qu et al.

(10) Patent No.: US 10,736,105 B2
(45) Date of Patent: Aug. 4, 2020

(54) INFORMATION TRANSMISSION METHOD, APPARATUS, AND SYSTEM

(71) Applicant: HUAWEI TECHNOLOGIES CO., LTD., Shenzhen, Guangdong (CN)

(72) Inventors: Bingyu Qu, Beijing (CN); Jianqin Liu, Beijing (CN); Kunpeng Liu, Beijing (CN); Yongxing Zhou, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/829,535

(22) Filed: Dec. 1, 2017

(65) Prior Publication Data

US 2018/0103475 A1 Apr. 12, 2018

Related U.S. Application Data

(63) Continuation of application No. PCT/CN2015/080781, filed on Jun. 4, 2015.

(51) Int. Cl.
*H04W 72/04* (2009.01)
*H04W 84/04* (2009.01)

(52) U.S. Cl.
CPC ....... *H04W 72/0453* (2013.01); *H04W 72/04* (2013.01); *H04W 84/042* (2013.01);
(Continued)

(58) Field of Classification Search
None
See application file for complete search history.

(56) References Cited

U.S. PATENT DOCUMENTS

| 7,848,448 B2 * | 12/2010 | Han | H04L 5/0007 375/295 |
| 7,899,481 B2 * | 3/2011 | McCoy | H04L 5/0053 455/522 |

(Continued)

FOREIGN PATENT DOCUMENTS

| CN | 1801680 A | 7/2006 |
| CN | 102833861 A | 12/2012 |

(Continued)

OTHER PUBLICATIONS

International Search Report in International Application No. PCT/CN2015/080781, dated Feb. 24, 2016, 6 pages.
(Continued)

*Primary Examiner* — Gregory B Sefcheck
(74) *Attorney, Agent, or Firm* — Fish & Richardson P.C.

(57) ABSTRACT

The present disclosure describes a message transmission method. In one example method, a first signal is received by a first device from a second device using a radio channel. A second signal, corresponding to and different from the received first signal, is transmitted by the second device to the first device. Information carried by the second signal corresponds to one of M state values. A first sequence corresponding to one or more subcarriers occupied by the second signal is directly proportional to a product of a preset second sequence and a third sequence in a state sequence set. Channel information of the radio channel is estimated by the first device according to the received first signal and the preset second sequence. The information carried by the second signal is determined by the first device according to the estimated channel information of the radio channel and the received first signal.

19 Claims, 5 Drawing Sheets

First communications device

Second communications device

(52) U.S. Cl.
CPC .............. *Y02D 70/00* (2018.01); *Y02D 70/10* (2018.01); *Y02D 70/12* (2018.01); *Y02D 70/126* (2018.01); *Y02D 70/1262* (2018.01); *Y02D 70/21* (2018.01)

(56) References Cited

U.S. PATENT DOCUMENTS

| | | | | |
|---|---|---|---|---|
| 7,929,415 B2* | 4/2011 | Kwak | ................... | H04L 5/0057 370/208 |
| 8,140,102 B2* | 3/2012 | Nory | ..................... | H04W 52/08 370/318 |
| 8,165,228 B2* | 4/2012 | Lee | ....................... | H04L 1/0028 375/260 |
| 8,228,782 B2* | 7/2012 | Han | ........................ | H04L 5/023 370/204 |
| 8,295,155 B2* | 10/2012 | Cho | ...................... | H04L 1/1607 370/209 |
| 8,331,947 B2* | 12/2012 | Kim | ...................... | H04L 1/1854 455/450 |
| 8,363,692 B2* | 1/2013 | Han | .................... | H04L 25/0226 375/130 |
| 8,509,344 B2* | 8/2013 | Ogawa | ................. | H04J 13/0055 370/208 |
| 8,761,090 B2* | 6/2014 | Han | ..................... | H04B 7/0689 370/328 |
| 9,025,476 B2* | 5/2015 | Weng | .................... | H04W 48/20 370/252 |
| 9,084,269 B2* | 7/2015 | Tabet | ...................... | G06F 17/141 |
| 9,094,065 B2* | 7/2015 | Takata | .................. | H04L 5/0051 |
| 9,100,228 B2* | 8/2015 | Hijazi | ................. | H04L 25/0212 |
| 9,137,624 B2* | 9/2015 | Park | ........................ | H04W 4/70 |
| 9,397,780 B2* | 7/2016 | Tanada | .................. | H04L 25/022 |
| 9,516,513 B2* | 12/2016 | SæGrov | ............... | H01Q 3/2605 |
| 9,577,792 B2* | 2/2017 | Kim | ................... | H04W 72/0446 |
| 9,730,174 B2* | 8/2017 | Seo | ..................... | H04W 56/002 |
| 9,763,177 B1* | 9/2017 | Baskaran | .............. | H04W 48/16 |
| 9,780,970 B2* | 10/2017 | Hombs | .............. | H04L 25/0202 |
| 9,800,364 B2* | 10/2017 | Noh | ....................... | H04L 5/0016 |
| 9,813,263 B2* | 11/2017 | Iwai | ........................ | H04J 13/22 |
| 9,973,362 B2* | 5/2018 | Jia | ....................... | H04B 7/0452 |
| 10,298,376 B2* | 5/2019 | Han | ....................... | H04L 5/0053 |
| 10,454,720 B2* | 10/2019 | Iwai | ....................... | H04B 7/024 |
| 2007/0183386 A1* | 8/2007 | Muharemovic | .......... | H04L 5/023 370/344 |
| 2008/0232486 A1* | 9/2008 | Kowalski | ............ | H04L 27/2613 375/260 |
| 2009/0175228 A1* | 7/2009 | Kimura | ................. | H04L 5/0007 370/329 |
| 2010/0074244 A1* | 3/2010 | Luo | ........................ | H04L 5/0007 370/343 |
| 2010/0238984 A1* | 9/2010 | Sayana | ................. | H04B 7/0634 375/219 |
| 2013/0157667 A1* | 6/2013 | Nakamura | ............ | H04L 5/0048 455/440 |
| 2013/0343477 A9* | 12/2013 | Jia | ............................ | H04J 11/00 375/295 |
| 2014/0105148 A1* | 4/2014 | Liu | ....................... | H04L 1/1614 370/329 |
| 2014/0177427 A1* | 6/2014 | Yiu | ......................... | H04L 5/001 370/208 |
| 2014/0241284 A1* | 8/2014 | Zhou | .................... | H04L 5/0035 370/329 |
| 2015/0009847 A1 | 1/2015 | Iwai et al. | | |
| 2015/0173079 A1* | 6/2015 | Yokomakura | ........... | H04L 5/001 370/329 |
| 2017/0214442 A1* | 7/2017 | Chae | ................. | H04W 72/0446 |
| 2018/0131485 A1* | 5/2018 | Wang | .................... | H04L 5/0055 |
| 2018/0191423 A1* | 7/2018 | Qu | ............................ | H04B 7/12 |

FOREIGN PATENT DOCUMENTS

| | | |
|---|---|---|
| CN | 103096389 A | 5/2013 |
| CN | 103702424 A | 4/2014 |

OTHER PUBLICATIONS

Xiaolin Hou et al., "Demodulation Reference Signal Design and Channel Estimation for LTE-Advanced Uplink", Apr. 11, 2011, www.intechopen.com, total 17 pages.

Extended European Search Report issued in European Application No. 15893738.3 dated Apr. 4, 2018, 8 pages.

Office Action issued in Chinese Application No. 201580080375.6 dated Jun. 10, 2019, 14 pages (with English translation).

* cited by examiner

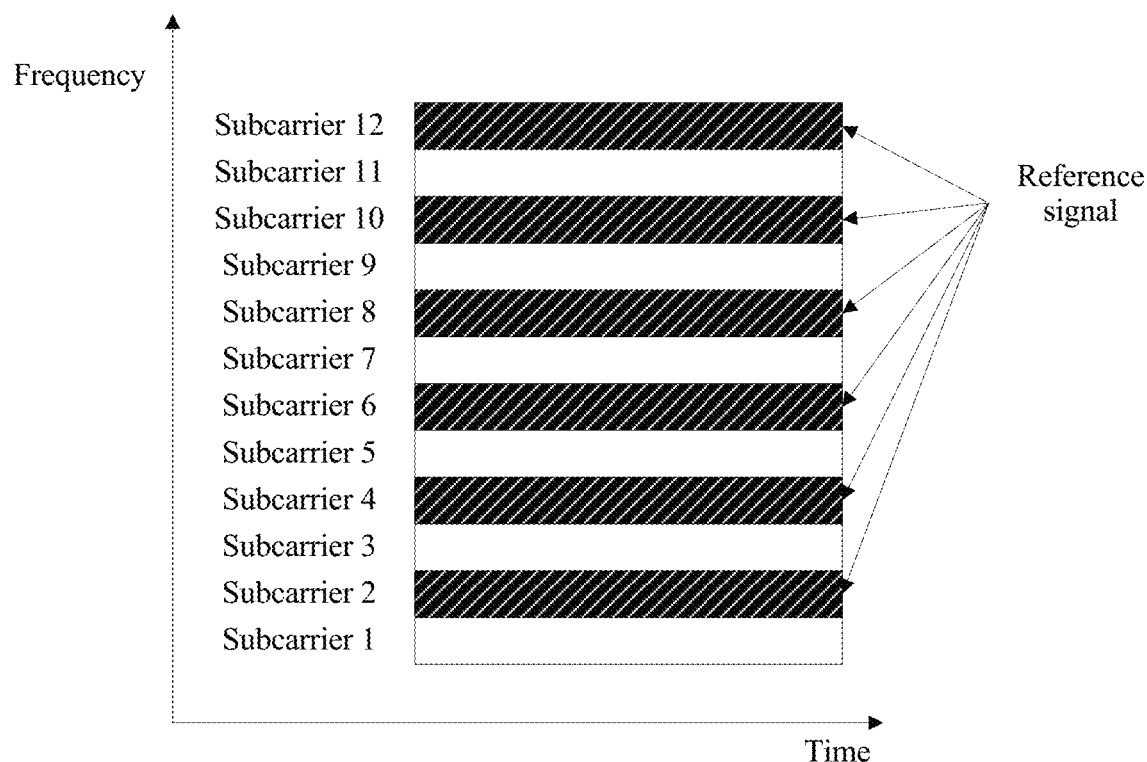
FIG. 1
First communications device
Second communications device
FIG. 2

401 — A second communications device determines a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet $K \geq M$, M is a positive integer greater than 1, and K is a positive integer less than a length of the third sequence 402 — The second communications device sends the second signal to a first communications device

FIG. 4

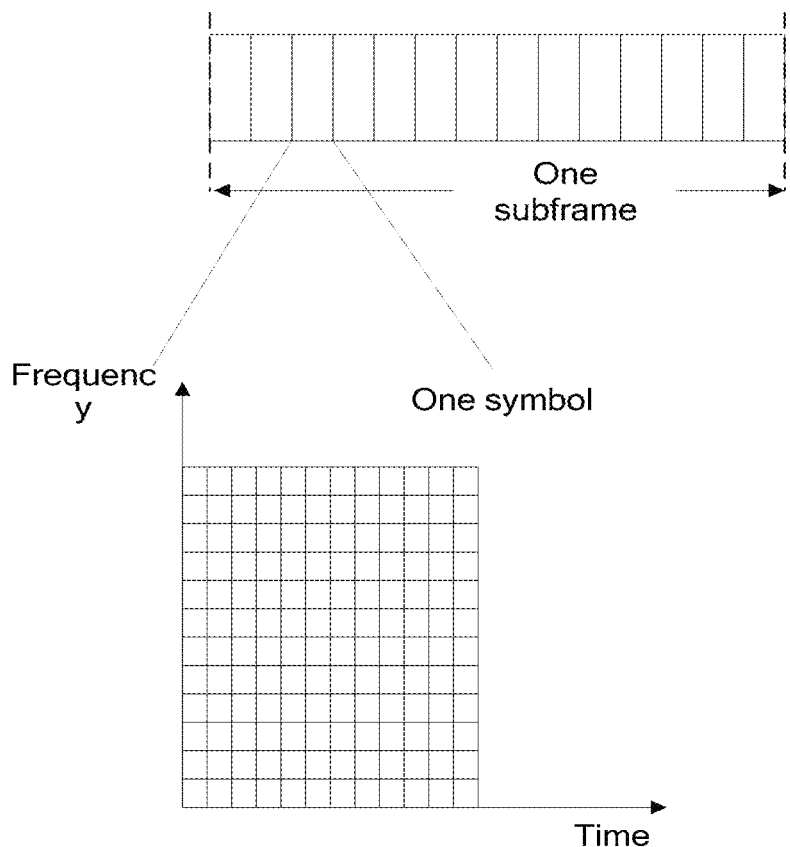

FIG. 5

601. A second communications device determines a to-be-sent second signal

602. The second communications device sends the second signal to a first communications device 603. The first communications device receives a first signal that is sent by the second communications device and that is transmitted by using a radio channel, where the first signal is corresponding to a second signal that is not transmitted by using the radio channel 604. The first communications device estimates channel information of the radio channel according to the first signal and a second sequence 605. The first communications device determines, according to the channel information of the radio channel and the first signal, information carried by the second signal

FIG. 6

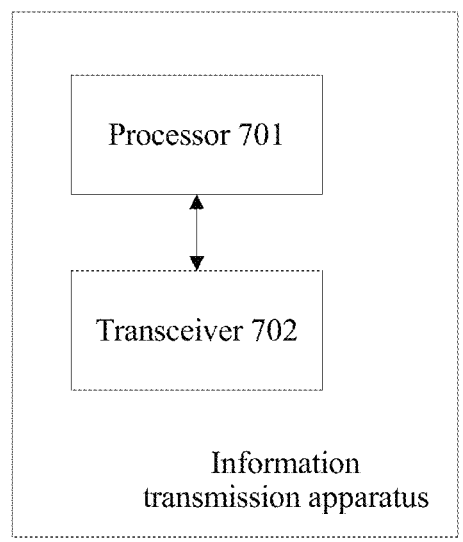

Processor 701

Transceiver 702

Information transmission apparatus

FIG. 7

INFORMATION TRANSMISSION METHOD, APPARATUS, AND SYSTEM

CROSS-REFERENCE TO RELATED APPLICATION

This application is a continuation of International Application No. PCT/CN2015/080781, filed on Jun. 4, 2015, the disclosure of which is hereby incorporated by reference in its entirety.

TECHNICAL FIELD

The present invention relates to the communications field, and in particular, to an information transmission method, apparatus, and system.

BACKGROUND

In the wireless communications field, because of factors such as mutual movement between communications devices, noise, or a radio channel, a signal received by a communications device at a receive end is generally different from a sent signal. To enhance receiving performance, the communications device at the receive end generally needs to equalize the received signal. Generally, the communications device at the receive end needs to perform channel estimation. Considering implementation complexity, an existing mobile communications system generally does not use a blind estimation method but transmits one or more signals pre-known by both a transmit end and a receive end, so as to implement the channel estimation. For example, in an LTE system, user equipment (English: User Equipment, UE for short) sends a reference signal, to a base station, that is pre-known by both the user equipment and the base station, so that the base station estimates a radio channel that is from the user equipment to the base station, so as to facilitate subsequent processing.

A reference signal used for the channel estimation is generally pre-known by both the transmit end and the receive end. Therefore, for the transmit end of wireless communications, the reference signal does not carry any information. For a receive end, channel information carried by the reference signal is represented by a difference between a received reference signal and a locally stored reference signal copy.

A technical solution called "comb" frequency division multiplexing (Comb Frequency Division Multiplexing) is used to enable a communications device at a transmit end to transmit, in one symbol, both a reference signal used for channel estimation and a signal that carries to-be-transmitted information. A specific solution is: The communications device at a transmit end divides a frequency resource that is corresponding to the communications device and that is in a symbol into two subcarrier groups; and transmits the reference signal in one subcarrier group, and maps the to-be-transmitted information to another subcarrier group. FIG. 1 shows resource mapping statuses of the reference signal and the signal carrying the to-be-transmitted information that are transmitted in the symbol by a communications device at a transmit end. The frequency resource that is occupied by the sending device and that is in the symbol is divided into 12 subcarriers whose serial numbers are sequentially 1 to 12. Subcarriers with odd serial numbers in the 12 subcarriers are used to map the reference signal, and the reference signal is pre-known by both a transmit end and a receive end; and subcarriers with even serial numbers in the 12 subcarriers are used to map the signal corresponding to the to-be-transmitted information.

A technical problem of an uncontrollable signal peak-to-average ratio exists in the foregoing technical solution. Specifically, a reference signal and a signal carrying information that are mapped by the sending device in one symbol are two random signals. Therefore, from a perspective of a time domain, after the two random signals are added together, single carrier characteristics of the signals are actually damaged. Consequently, a peak-to-average ratio is relatively high. This imposes an excessively high requirement on performance of a radio frequency module of the communications device at a transmit end.

SUMMARY

Embodiments of the present invention provide an information transmission method, so as to resolve a technical problem that when a signal that carries to-be-transmitted information and a reference signal are transmitted in one symbol, a peak-to-average ratio of a signal transmitted in the symbol is uncontrollable.

According to a first aspect, an embodiment of the present invention provides an information transmission method, including:

receiving, by a first communications device, a first signal that is sent by a second communications device and that is transmitted by using a radio channel, where information carried by a second signal that is corresponding to the first signal and that is not transmitted by using the radio channel is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence;

estimating, by the first communications device, channel information of the radio channel according to the first signal and the second sequence; and determining, by the first communications device according to the channel information of the radio channel and the first signal, the information carried by the second signal.

In a first possible implementation of the first aspect, the first sequence is specifically $\{A_0, A_1, A_2, \ldots, A_{N-1}\}$, and $A_i$ is an element whose serial number is i in the first sequence; the second sequence is specifically $\{B_0, B_1, B_2, \ldots, B_{N-1}\}$, and $B_i$ is an element whose serial number is i in the second sequence; a third sequence whose serial number is s in the state sequence set is specifically $\{C_{s0}, C_{s1}, \ldots, C_{s(N-1)}\}$, and $C_{si}$ is an element whose serial number is i in the third sequence whose serial number is s in the state sequence set; i=0, 1, 2, . . . , N−1, s=0, 1, 2, . . . , M−1, and N indicates a quantity of elements of the first sequence, the second sequence, or any third sequence in the state sequence set; and that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, ..., N−1, and s=0, 1, 2, ..., M−1.

With reference to the first possible implementation of the first aspect, in a second possible implementation, that any third sequence in the M third sequences is a complex exponential sequence with a linear phase, and elements with an interval of K−1 elements in any third sequence are equivalent includes:

the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W = e^{(-j2\pi/K)}$ or $W = e^{(+j2\pi/K)}$, e is a natural base, j is an imaginary unit, and K is a positive integer less than N;
i=0, 1, 2, ..., N−1;
s=0, 1, 2, ..., M−1; and
f(s) is a function of s, and f(s) is corresponding to a state value corresponding to the third sequence whose serial number is s.

With reference to the second possible implementation of the first aspect, in a third possible implementation, f(s) is specifically f(s)=s or f(s)=−s.

With reference to any one of the first aspect, or the first to the third possible implementations of the first aspect, in a fourth possible implementation, the preset second sequence includes a subcarrier sequence corresponding to an uplink reference signal in an LTE system, or a Zadoff-Chu sequence, or a sequence obtained after a Zadoff-Chu (Zadoff-Chu) sequence is cyclically expanded or truncated.

With reference to any one of the first to the fourth possible implementations of the first aspect, in a fifth possible implementation, K is a proper divisor except 1 of N.

With reference to any one of the first to the fifth possible implementations of the first aspect, in a sixth possible implementation, the estimating, by the first communications device, channel information of the radio channel according to the first signal includes:

estimating, by the first communications device, the channel information of the radio channel according to at least an element $D_p$ of a fourth sequence corresponding to subcarriers occupied by the first signal, $B_p$ of the second sequence, an element $D_{p+q \times K}$ of the fourth sequence, and an element $B_{p+q \times K}$ of the second sequence, where the fourth sequence is $\{D_0, D_1, D_2, \ldots, D_{N-1}\}$, and p is a non-negative integer less than N, p+q×K is a non-negative integer less than N, and q is an integer except 0.

With reference to the sixth possible implementation of the first aspect, in a seventh possible implementation, p is 0.

With reference to any one of the first to the seventh possible implementations of the first aspect, in an eighth possible implementation, the determining, by the first communications device according to the channel information of the radio channel and the first signal, the information carried by the second signal includes:

equalizing, by the first communications device, the first signal according to channel information of the radio channel;

determining, by the first communications device, the third sequence in the state sequence set according to the equalized first signal and the second sequence; and determining, by the first communications device according to the third sequence, a state value corresponding to the third sequence.

According to a second aspect, an embodiment of the present invention provides an information transmission method, including:

determining, by a second communications device, a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence; and sending, by the second communications device, the second signal to the first communications device.

In a first possible implementation of the second aspect, the first sequence is specifically $\{A_0, A_1, A_2, \ldots, A_{N-1}\}$, and $A_i$ is an element whose serial number is i in the first sequence; the second sequence is specifically $\{B_0, B_1, B_2, \ldots, B_{N-1}\}$, and $B_i$ is an element whose serial number is i in the second sequence; a third sequence whose serial number is s in the state sequence set is specifically $\{C_{s0}, C_{s1}, \ldots, C_{s(N-1)}\}$, and $C_{si}$ is an element whose serial number is i in the third sequence whose serial number is s in the state sequence set; i=0, 1, 2, ..., N−1, s=0, 1, 2, ..., M−1, and N indicates a quantity of elements of the first sequence, the second sequence, or any third sequence in the state sequence set; and that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, ..., N−1, and s=0, 1, 2, ..., M−1.

With reference to the first possible implementation of the second aspect, in a second possible implementation, that any third sequence in the M third sequences is a complex exponential sequence with a linear phase, and elements with an interval of K−1 elements in any third sequence are equivalent includes:

the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W = e^{(-j2\pi/K)}$ or $W = e^{(+j2\pi/K)}$, e is a natural base, j is an imaginary unit, and K is a positive integer less than N;
i=0, 1, 2, ..., N−1;
s=0, 1, 2, ..., M−1; and
f(s) is a function of s, and f(s) is corresponding to a state value corresponding to the third sequence whose serial number is s.

With reference to the second possible implementation of the second aspect, in a third possible implementation, f(s) is specifically f(s)=s or f(s)=−s.

With reference to any one of the second aspect, or the first to the third possible implementations of the second aspect, in a fourth possible implementation, the preset second sequence includes a subcarrier sequence corresponding to an uplink reference signal in an LTE system, or a Zadoff-Chu sequence, or a sequence obtained after a Zadoff-Chu (Zadoff-Chu) sequence is cyclically expanded or truncated.

With reference to any one of the first to the fourth possible implementations of the second aspect, in a fifth possible implementation, K is a proper divisor except 1 of N.

According to a third aspect, an embodiment of the present invention provides an information transmission apparatus, including a processor and a transceiver, where the transceiver is configured to receive a first signal that is sent by a second communications device and that is transmitted by using a radio channel, where information carried by a second signal that is corresponding to the first signal and that is not transmitted by using the radio channel is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence;

the processor is configured to estimate channel information of the radio channel according to the first signal and the second sequence; and the processor is further configured to determine, according to the channel information of the radio channel and the first signal, the information carried by the second signal.

In a first possible implementation of the third aspect, the first sequence is specifically $\{A_0, A_1, A_2, \ldots, A_{N-1}\}$, and $A_i$ is an element whose serial number is i in the first sequence; the second sequence is specifically $\{B_0, B_1, B_2, \ldots, B_{N-1}\}$, and $B_i$ is an element whose serial number is i in the second sequence; a third sequence whose serial number is s in the state sequence set is specifically $\{C_{s0}, C_{s1}, \ldots, C_{s(N-1)}\}$, and $C_{si}$ is an element whose serial number is i in the third sequence whose serial number is s in the state sequence set; i=0, 1, 2, . . . , N−1, s=0, 1, 2, . . . , M−1, and N indicates a quantity of elements of the first sequence, the second sequence, or any third sequence in the state sequence set; and that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, . . . , N−1, and s=0, 1, 2, . . . , M−1.

With reference to the first possible implementation of the third aspect, in a second possible implementation, that any third sequence in the M third sequences is a complex exponential sequence with a linear phase, and elements with an interval of K−1 elements in any third sequence are equivalent includes:

the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W = e^{(-j2\pi/K)}$ or $W = e^{(+j2\pi/K)}$, e is a natural base, j is an imaginary unit, and K is a positive integer less than N;
i=0, 1, 2, . . . , N−1;
s=0, 1, 2, . . . , M−1; and
f(s) is a function of s, and f(s) is corresponding to a state value corresponding to the third sequence whose serial number is s.

With reference to the second possible implementation of the third aspect, in a third possible implementation, f(s) is specifically f(s)=s or f(s)=−s.

With reference to any one of the third aspect, or the first to the third possible implementations of the third aspect, in a fourth possible implementation, the preset second sequence includes a subcarrier sequence corresponding to an uplink reference signal in an LTE system, or a Zadoff-Chu sequence, or a sequence obtained after a Zadoff-Chu (Zadoff-Chu) sequence is cyclically expanded or truncated.

With reference to any one of the first to the fourth possible implementations of the third aspect, in a fifth possible implementation, K is a proper divisor except 1 of N.

With reference to any one of the first to the fifth possible implementations of the third aspect, in a sixth possible implementation, that the processor is configured to estimate channel information of the radio channel according to the first signal specifically includes:

the processor estimates the channel information of the radio channel according to at least an element $D_p$ of a fourth sequence corresponding to subcarriers occupied by the first signal, $B_p$ of the second sequence, an element $D_{p+q \times K}$ of the fourth sequence, and an element $B_{p+q \times K}$ of the second sequence, where the fourth sequence is $\{D_0, D_1, D_2, \ldots, D_{N-1}\}$, p is a non-negative integer less than N, p+q×K is a non-negative integer less than N, and q is an integer except 0.

With reference to the sixth possible implementation of the third aspect, in a seventh possible implementation, p is 0.

With reference to any one of the first to the seventh possible implementations of the third aspect, in an eighth possible implementation, that the processor is configured to determine, according to the channel information of the radio channel and the first signal, the information carried by the second signal includes:

the processor equalizes the first signal according to channel information of the radio channel;

the processor further determines the third sequence in the state sequence set according to the equalized first signal and the second sequence; and the processor determines, according to the third sequence, a state value corresponding to the third sequence.

According to a fourth aspect, an embodiment of the present invention provides an information transmission apparatus, including a processor and a transceiver, where the processor is configured to determine a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence; and the transceiver sends the second signal to the first communications device.

In a first possible implementation of the fourth aspect, the first sequence is specifically $\{A_0, A_1, A_2, \ldots, A_{N-1}\}$, and $A_i$ is an element whose serial number is i in the first sequence; the second sequence is specifically $\{B_0, B_1, B_2, \ldots, B_{N-1}\}$, and $B_i$ is an element whose serial number is i in the second sequence; a third sequence whose serial number is s in the state sequence set is specifically $\{C_{s0}, C_{s1}, \ldots, C_{s(N-1)}\}$, and $C_{si}$ is an element whose serial number is i in the third sequence whose serial number is s in the state sequence set; i=0, 1, 2, ..., N−1, s=0, 1, 2, ..., M−1, and N indicates a quantity of elements of the first sequence, the second sequence, or any third sequence in the state sequence set; and that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, ..., N−1, and s=0, 1, 2, ..., M−1.

With reference to the first possible implementation of the fourth aspect, in a second possible implementation, that any third sequence in the M third sequences is a complex exponential sequence with a linear phase, and elements with an interval of K−1 elements in any third sequence are equivalent includes:

the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W = e^{(-j2\pi/K)}$ or $W = e^{(+j2\pi/K)}$, e is a natural base, j is an imaginary unit, and K is a positive integer less than N;
i=0, 1, 2, ..., N−1;
s=0, 1, 2, ..., M−1; and
f(s) is a function of s, and f(s) is corresponding to a state value corresponding to the third sequence whose serial number is s.

With reference to the second possible implementation of the fourth aspect, in a third possible implementation, f(s) is specifically f(s)=s or f(s)=−s.

With reference to any one of the fourth aspect, or the first to the third possible implementations of the fourth aspect, in a fourth possible implementation, the preset second sequence includes a subcarrier sequence corresponding to an uplink reference signal in an LTE system, or a Zadoff-Chu sequence, or a sequence obtained after a Zadoff-Chu (Zadoff-Chu) sequence is cyclically expanded or truncated.

With reference to any one of the first to the fourth possible implementations of the fourth aspect, in a fifth possible implementation, K is a proper divisor except 1 of N.

According to a fifth aspect, an embodiment of the present invention provides an information transmission system, where:

a second communications device determines a to-be-sent second signal;

the second communications device sends the second signal to a first communications device;

the first communications device receives a first signal that is sent by the second communications device and that is transmitted by using a radio channel, where the first signal is corresponding to a second signal that is not transmitted by using the radio channel;

the first communications device estimates channel information of the radio channel according to the first signal and the second sequence;

the first communications device determines, according to the channel information of the radio channel and the first signal, information carried by the second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

According to the technical solutions provided in the embodiments of the present invention, a second signal sent by a second communications device to a first communications device may not only carry to-be-sent information, but also facilitate the first communications device in estimating, according to a received first signal, that is, the second signal that is transmitted by using a radio channel, channel information of the radio channel, so as to save energy. In addition, a peak-to-average ratio of the second signal is related to a preset second sequence, and therefore the second communications device may preset an appropriate second sequence to control the peak-to-average ratio of the second signal within an appropriate range.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

FIG. 1 shows a schematic diagram of a method for transmitting both a reference signal and information in one symbol in the prior art;

FIG. 2 shows a schematic diagram of a communications system architecture;

FIG. 4 shows a flowchart of an information transmission method according to an embodiment of the present invention;

FIG. 5 shows a schematic diagram of a time-frequency domain of an OFDM symbol mentioned in this embodiment of the present invention;

FIG. 6 shows a flowchart of an information transmission method according to an embodiment of the present invention;

FIG. 7 shows a flowchart of an information transmission apparatus according to an embodiment of the present invention.

DESCRIPTION OF EMBODIMENTS

Figure 3:
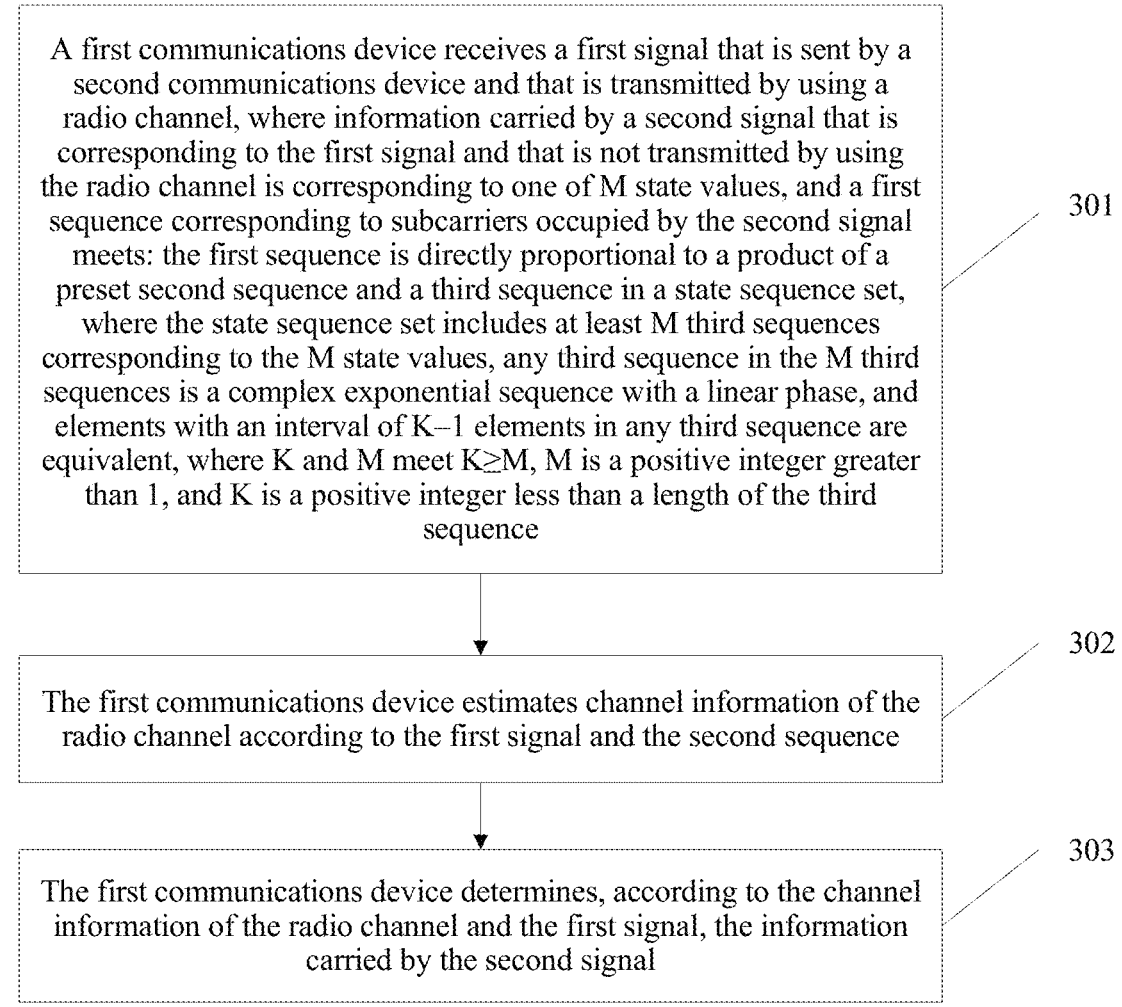
FIG. 3 shows a flowchart of an information transmission method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

It should be understood that the technical solutions provided in the embodiments of the present invention may be applied to a wireless communications system based on an orthogonal frequency division multiplexing (English: Orthogonal Frequency Division Multiplexing, OFDM for short) technology, or may be applied to wireless communications systems such as a direct sequence spread spectrum communications system and a frequency hopping spread spectrum communications system. This is not limited in the present invention.

It should also be understood that a first communications device and a second communications device mentioned in the embodiments of the present invention are merely used for distinguishing between different wireless communications devices and impose no further limitation. With reference to a specific application scenario, the first communications device or the second communications device may be user equipment, a mobile terminal, a base station, an eNodeB, a micro base station, a relay node, or the like, in a mobile communications system. This is not limited in the present invention.

FIG. 2 shows an application scenario of a technical solution provided in this embodiment of the present invention. Two wireless communications devices are included in the scenario: a first communications device and a second communications device. In a communication process, the first communications device is specifically a receiving device, and the second communications device is specifically a sending device. A more specific application scenario is used as an example. For example, in a Long Term Evolution (English: Long Term Evolution, LTE for short) system, the first communications device is a cell base station and the second communications device is user equipment, or vice versa.

In an application scenario shown in FIG. 2, the second communications device sends a signal to the first communications device. When the signal arrives at the first communications device after being transmitted on a radio channel, the signal distorts because of impact of the radio channel. Distortion herein includes attenuation of the signal in some frequencies because of the multipath effect. To enhance signal receiving performance and decrease a bit error rate, generally, the second communications device sends, to the first communications device, a reference signal agreed by both the first communications device and the second communications device, and the first communications device compares a received reference signal with a locally stored reference signal copy, so as to obtain channel information of the radio channel. After obtaining the channel information of the radio channel, the first communications device may equalize or adjust another received signal by using the channel information, so as to enhance the signal receiving performance and decrease the bit error rate.

It can be learned that in the scenario shown in FIG. 2, the second communications device needs to send a sequence that does not carry any information, so as to assist the first communications device in channel estimation.

To use a transmission resource of the radio channel more efficiently, a technical solution called "comb" frequency division multiplexing is used to enable a communications device at a transmit end to transmit, in one symbol, both a reference signal used for channel estimation and a signal that carries to-be-transmitted information. This technical solution is specifically: to transmit, in one symbol, both a reference signal and a signal that carries valid information, the communications device at a transmit end divides a frequency resource that is available to the communications device at the transmit end in the symbol, into two carrier groups that do not overlap, so as to respectively transmit the reference signal and the signal that carries the valid information.

FIG. 1 shows a schematic diagram of this technical solution. The figure shows a specific time resource and a specific frequency resource that are occupied by the communications device at a transmit end and that are in one symbol. The occupied frequency resource in the symbol includes multiple subcarriers, and the subcarriers are classified into at least two subcarrier groups. The communications device transmits the reference signal in one subcarrier group and transmits the signal that carries the to-be-transmitted information in the other subcarrier group.

However, in the technical solution shown in FIG. 2, in one symbol, a physical resource block occupied by the communications device at a transmit end is divided into at least two "comb teeth" to transmit both the reference signal and the to-be-transmitted information. Correlation between the reference signal and the signal that carries information that are mapped by the sending device in the symbol is uncertain. Therefore, from a perspective of the time domain, after two random signals are added together, single carrier characteristics of the signals are probably damaged. Consequently, a peak-to-average ratio is relatively high. When the communications device at a transmit end is a device with a relatively weak radio frequency capability such as user equipment or a mobile terminal, the relatively high peak-to-average ratio probably affects radio frequency performance of the device.

Embodiment 1

An embodiment of the present invention provides an information transmission method. In the method provided in this embodiment of the present invention, a signal sent by a second communications device carries to-be-transmitted information. After receiving the signal sent by the second communications device, a first communications device may obtain the to-be-transmitted information added by the second communications device into the signal, and may further obtain channel information of a radio channel passed by the signal during transmission.

FIG. 3 shows a procedure of an information transmission method provided in an embodiment of the present invention. The procedure includes at least the following steps.

Step 301: A first communications device receives a first signal that is sent by a second communications device and that is transmitted by using a radio channel, where information carried by a second signal that is corresponding to the first signal and that is not transmitted by using the radio channel is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

It should be understood that, considering impact of the radio channel, a second signal sent by the second communications device is different from a first signal received by the first communications device. Specifically, under the action of the radio channel, a frequency, a phase, and an amplitude of the first signal received by the first communications device may change when compared with those of the second signal. For example, when the radio channel is a multipath channel, compared with the second signal, the first signal may be greatly attenuated in some frequencies. For another example, when a relative motion exists between the first communications device and the second communications device, because of the Doppler effect, a frequency occupied by the received first signal may slightly deviate from a frequency occupied by the second signal It should be understood that the first signal also carries the information carried by the second signal. Although the second signal forms the first signal under the action of the radio channel and noise, generally, from a perspective of a receive end, the information carried by the second signal may still be recovered from the first signal.

In a specific implementation process, the second signal sent by the second communications device carries the to-be-transmitted information, and specifically, the to-be-transmitted information is corresponding to one of M state values, and M is a positive integer greater than 1. An example is used for description. A communications device at a transmit end expects to transmit either "acknowledgment" information or "negative acknowledgment" information to a communications device at a receive end, so that the communications device at a transmit end selects, from a predefined state set, a state element corresponding to the "acknowledgment" information or a state element corresponding to the "negative acknowledgment" information, and sends a signal corresponding to the state element to the communications device at a receive end.

In this embodiment of the present invention and another embodiment of the present invention, it should be understood that M is a positive integer not less than 2, that is, the to-be-transmitted information is one of at least two types of optional information. For example, the to-be-transmitted information is either the "acknowledgment" information or the "negative acknowledgment" information.

It should be understood that transmission of a radio signal needs to occupy time resources and frequency resources, and in a specific implementation process, the frequency resources occupied by the radio signal may be represented in a distributed manner, that is, the frequency resources occupied by the radio signal may be divided into multiple subcarriers. In this embodiment of the present invention, a set formed by the subcarriers is referred to as a subcarrier set. In the technical solution provided in this embodiment of the present invention, a sequence corresponding to a subcarrier set occupied by the second signal is defined as the first sequence.

In a specific implementation process, the first sequence corresponding to the subcarriers occupied by the second signal meets: the first sequence is directly proportional to the product of the preset second sequence and the third sequence in the state sequence set. Specifically, the second sequence is preset, that is, the second sequence is known by both the first communications device and the second communications device; and a method for enabling both the first communications device and the second communications device to know the second sequence may be that: the second sequence is determined by the first communications device and the second communications device by means of mutual communication before step 301 is performed, or is defaulted or predefined by the first communications device and the second communications device.

It should be understood that the first sequence is directly proportional to a product of the second sequence and the third sequence, that is, any element in the first sequence is directly proportional to a product of elements corresponding to the second sequence and the third sequence. The first sequence, the second sequence, and the third sequence have a same length.

In a specific implementation process, the state sequence set includes at least the M third sequences corresponding to the M state values. Specifically, to meet that the information carried by the second signal is one of the M state values, the state sequence set includes at least the M third sequences, so as to correspond to the M state values. Optionally, a quantity of the third sequences included in the state sequence set is greater than M; and further optionally, more than one third sequence is corresponding to one state value.

It should be understood that the state sequence set may further include another sequence. This is not limited in this embodiment of the present invention. To more clearly describe an idea embodied in this embodiment of the present invention, in this embodiment of the present invention, it is assumed that the $0^{th}$ sequence to the $(M-1)^{th}$ sequence in the state sequence set are the third sequences, and description is provided on this basis. In view of this, persons skilled in the art may easily extend the technical solution provided in this embodiment of the present invention to a scenario in which serial numbers of third sequences in a state sequence set are in another form, for example, a scenario in which the first sequence to the $M^{th}$ sequence in a state set are third sequences. Therefore, the assumption herein in this embodiment of the present invention should not be considered as a limitation to the technical solution provided in the present invention.

In a specific implementation process, any third sequence in the state sequence set is a complex exponential sequence with a linear phase, and elements with an interval of K−1 elements in any third sequence are equivalent. K is a positive integer less than a length of the third sequence, and K is greater than or equal to M.

It is worth noting that in this embodiment and another embodiment of the present invention, the complex exponential sequence with a linear phase $\{X_0, X_1, X_2, X_3, \ldots, X_i, \ldots\}$ is defined as:

$$X_i = X_{Const} \times e^{j \times g(i)}, \text{ where}$$

Xi is an element whose serial number is i in the foregoing complex exponential sequence, and i is any non-negative integer less than the length of the sequence; $X_{Const}$ is a complex constant; and e is a natural base, j is an identifier of an imaginary number, g(i) is a linear function in which i is a variable, and a common g(i) may be expressed as:

g(i)=axi+b, where for a sequence, a and b are real constants.

Correspondingly, in this embodiment of the present invention, if it is assumed that the third sequence whose serial number is s in the state sequence set is $\{C_{s0}, C_{s1}, C_{s2}, \ldots, C_{s(N-1)}\}$, the third sequence meets:

$$C_{si}=C_{Const} \times e^{j \times f(s) \times h(i)}, \text{ where}$$

$C_{si}$ is an element whose serial number is i in the third sequence whose serial number is s in the state sequence set; $C_{Const}$ is a complex constant that is constant in the $s^{th}$ sequence or is constant in the state sequence set; and e is a natural base, j is an identifier of an imaginary number, N is a length of the third sequence, h(i) is a linear function in which i is a variable, and f(s) is a function in which s is a variable. In a specific implementation process, f(s) is actually corresponding to a state value corresponding to the third sequence whose serial number is s. In a specific implementation process, the third sequence whose length is N may be obtained after a sequence whose length is K is cyclically expanded, that is, $C_{s(i+K)}=C_{s(i \mod K)}$, where i=0, 1, 2, ..., N−K−1.

It is worth noting that N is also lengths of the first sequence and the second sequence.

Further, in a specific implementation process, elements with an interval of K−1 elements in any third sequence are equivalent, that is, $C_{si}=C_{s(i+K)}$, and (i+K) is a positive integer that is not greater than N−1. An example is used for further description. If K is 4, elements with an interval of three elements in any third sequence are equivalent. Therefore, for a sequence $\{C_{s0}, C_{s1}, C_{s2}, C_{s3}, C_{s4}, C_{s5}, C_{s6}, \text{ and } C_{s7}\}$, $C_{s1}=C_{s5}$. $C_{s1}$ and $C_{s5}$ have an interval of three elements, that is, $C_{s2}, C_{s3}$, and $C_{s4}$.

Optionally, K is equal to M, that is, elements with an interval of M−1 elements in any third sequence are equivalent. This ensures that when there are M to-be-transmitted state values, third sequence values on subcarriers that have an interval of M−1 subcarriers are the same. Therefore, channel estimation may be performed based on the subcarriers on which a same third sequence value is acted.

It should be understood that in the technical solution provided in this embodiment of the present invention, the state sequence set is an abstract concept provided for persons skilled in the art to clearly understand a purpose of the present invention. Existence forms of the state sequence set and the third sequences in the state sequence set in the first communications device and/or the second communications device are not limited in this embodiment of the present invention. In a specific implementation process, each third sequence in the state sequence set may exist in a memory of a communications device in a form of a complete sequence, or only several adjacent elements in the third sequence are stored. During application, a complete third sequence may be generated by using the several adjacent elements. The memory may also store parameters of only one third sequence, such as an initial phase and/or a phase increment; and a complete third sequence is obtained by means of calculation according to the parameters.

Step 302: The first communications device estimates channel information of the radio channel according to the first signal and the second sequence.

In a specific implementation process, the second signal becomes the first signal after being transmitted by using the radio channel, that is, the first signal is a signal generated on the basis of the second signal and under an action of the radio channel. In a specific communication process, to more reliably obtain information transmitted by the second communications device to the first communications device, the first communications device may obtain related information of the radio channel and further process a received first signal according to the channel information.

In a specific implementation process, as a communication receiving party, after receiving the first signal transmitted on the radio channel, the first communications device may estimate the channel information of the radio channel by comparing the received first signal with a preset second sequence. One feasible method is: After receiving the first signal transmitted on the radio channel, the first communications device converts the first signal into a corresponding frequency domain sequence, and then compares the frequency domain sequence with the preset second sequence, so as to obtain an estimate of the channel information of the radio channel.

Step 303: The first communications device determines, according to the channel information of the radio channel and the first signal, the information carried by the second signal.

Specifically, the first communications device processes the first signal according to the channel information obtained in step 302, and determines, according to the processed first signal, the information added by the second communications device into the second signal.

In this technical solution provided in this embodiment of the present invention, the first communications device not only obtains, according to the received first signal, the channel information of the radio channel passed by the second signal, but also processes the first signal according to the channel information of the radio channel, so that the information added by the second communications device into the second signal can be determined more reliably. That is, both an estimate of the channel information of the radio channel and the information added by the second communications device into the first signal are obtained by detecting the first signal. In this process, no extra energy is wasted. Therefore, according to the method provided in this embodiment of the present invention, the first communications device and the second communications device that perform communication not only improve usage efficiency of radio resources, but also improve reliability of signal transmission.

In a specific implementation process, it is assumed that the first sequence is specifically $\{A_0, A_1, \ldots, A_{N-1}\}$, and $A_i$ is an element whose serial number is i in the first sequence; the second sequence is specifically $\{B_0, B_1, \ldots, B_{N-1}\}$, and $B_i$ is an element whose serial number is i in the second sequence; a third sequence whose serial number is s in the state sequence set is specifically $\{C_{s0}, C_{s1}, C_{s2}, \ldots, C_{s(N-1)}\}$, and $C_{si}$ is an element whose serial number is i in the third sequence whose serial number is s in the state sequence set; and i=0, 1, 2, ..., N−1, s=0, 1, ..., M−1, and N indicates a quantity of elements of the first sequence, the second sequence, or any third sequence in the state sequence set.

In a specific implementation process of step 301, optionally, that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, such as 1, i=0, 1, 2, ..., N−1, and s=0, 1, 2, ..., M−1.

Optionally, the element whose serial number is i in the first sequence may further meet:

$A_i = A_{Const1} \times B_i \times C_{si} + A_{Const2}$, where both $A_{Const1}$ and $A_{Const2}$ are constants, and $A_{Const2}$ represents a direct current bias of the first sequence.

In a specific implementation process of step 301, optionally, that any third sequence in the M third sequences in the state sequence set is a complex exponential sequence with a linear phase, and elements with an interval of K−1 elements in any third sequence are equivalent may further indicate:

the element whose serial number is i in the third sequence whose serial number is s in the first set meets:

$$C_{si} = B_{Const} \times W^{f(s) \times i}, \text{ where:}$$

$B_{Const}$ is a complex constant except 0, such as 1, $W = e^{(-j2\pi/K)}$ or $W = e^{(+j2\pi/K)}$, e is a natural base, j is an imaginary unit, K is a positive integer less than N, and i=0, 1, 2, ..., N−1; and s=0, 1, ..., M−1, f(s) is a function of s, and f(s) is corresponding to a state value corresponding to the third sequence whose serial number is s.

According to this implementation, a conversion relationship between a time domain operation and a frequency domain operation is further considered. More specifically, a frequency-domain phase shift is corresponding to a time-domain time shift. For example, one signal occupies N subcarriers. A value of a subcarrier whose serial number is k occupied by the signal is X(k), and k=0, 1, ..., N−1. After a phase shift occurs in the signal in the frequency domain, which is equivalent to that $e^{(-j*k*2\pi/N*n_0)}$ is acted on the signal, the value of the corresponding subcarriers whose serial number is k changes to $Y(k) = X(k) \, e^{(-j*k*2\pi/N*n_0)}$. Therefore, a time-domain signal value y(t) corresponding to {Y(k)} is a cyclic shift of a time-domain signal value x(t) corresponding to {X(k)}, and $y(t) = x(t - t_0)$, where $t_0 = n_0/N*T$, and T is a period of a periodic function x(t). N is sequence lengths of {X(k)} and {Y(k)}, $n_0$ is a real number, and optionally, $n_0 = N/K$, and K is an integer.

It can be learned that when the first sequence corresponding to the subcarriers occupied by the second signal is directly proportional to the product of the preset second sequence and the third sequence, and the third sequence has the foregoing expression form, a time domain signal corresponding to the second signal is a cyclic shift of a time domain signal corresponding to the preset second sequence.

When the third sequence has the foregoing characteristic, in a specific implementation process, the second communications device may obtain a to-be-sent signal by performing a simple time domain shift on a time sequence corresponding to the preset second sequence. Therefore, operation complexity can be reduced, and a design of an algorithm used when the second communications device sends a signal can be simplified. When the second communications device sends the second signal, a peak-to-average ratio of the second signal is determined by the preset second sequence, so that when the second communications device sends a signal, a peak-to-average ratio of the signal is controllable.

Further optionally, the preset second sequence includes a sequence corresponding to an uplink reference signal in the LTE system, or a Zadoff-Chu (Zadoff-Chu) sequence, or a sequence obtained after a Zadoff-Chu (Zadoff-Chu) sequence is cyclically expanded or truncated.

The second sequence is considered as a frequency domain sequence, and a time domain sequence converted from the second sequence may still maintain an advantage of a low peak-to-average ratio. Therefore, the second signal sent by the second communications device also has the advantage of the low peak-to-average ratio. This is significant for some communications devices whose radio frequency capabilities are not strong, such as a handheld terminal and user equipment. That is, this helps decrease a peak-to-average ratio when the second communications device sends the first sequence, thereby reducing a performance requirement of a radio frequency module of the second communications device. Specifically, a requirement of power back-off value of a radio frequency part of the second communications device is reduced, that is, a requirement of a dynamic range of a power amplifier of the second communications device is reduced.

Alternatively, further optionally, the time domain sequence corresponding to the preset second sequence is a sequence that has a constant envelope characteristic. When the element whose serial number is i in the third sequence whose serial number is s in the state sequence set meets a form: $C_{si} = B_{Const} \times W^{f(s) \times i}$, the second signal is a time shift of the time domain sequence corresponding to the preset second sequence. Therefore, the second signal also has the constant envelope characteristic. Therefore, a requirement of a radio frequency capability of a communications device can be reduced.

In a specific implementation process of step 301, optionally, the element $C_{si}$ whose serial number is i in the third sequence whose serial number is s in the state sequence set meets: $C_{si} = B_{Const} \times W^{f(s) \times i}$, where one expression form of f(s) may be f(s)=s or f(s)=−s.

Specifically, the element $C_{si}$ whose serial number is i in the third sequence whose serial number is s in the state sequence set meets:

$$C_{si} = B_{Const} \times W^{s \times i} = B_{Const} \times e^{(-j2\pi/K) \times s \times i}$$

When the element whose serial number is i in the third sequence whose serial number is s in the state sequence set meets the foregoing condition, the state sequence set may be expressed as:

$$\begin{aligned}
&\{ \\
&\{1, 1, 1, ..., 1\} \\
&\{1, e^{(-j2\pi/K)}, e^{(-j2\pi/K) \times 2}, ..., e^{(-j2\pi/K) \times (N-1)}\}; \\
&\{1, e^{(-j2\pi/K) \times 2}, e^{(-j2\pi/K) \times 4}, ..., e^{(-j2\pi/K) \times 2 \times (N-1)}\}; \\
&\{1, e^{(-j2\pi/K) \times 3}, e^{(-j2\pi/K) \times 6}, ..., e^{(-j2\pi/K) \times 3 \times (N-1)}\}; \\
&... \\
&\{1, e^{(-j2\pi/K) \times (M-1)}, e^{(-j2\pi/K) \times 2 \times (M-1)}, ..., e^{(-j2\pi/K) \times (M-1) \times (N-1)}\}; \\
&\}
\end{aligned}$$

It can be learned that a first element in any third sequence in the state sequence set is 1, so that it can be determined, with reference to the characteristic that elements with an interval of K−1 elements in the third sequence are equivalent, that regardless of a third sequence selected by the second communications device, the corresponding first element, K+1th element, $2K+1^{th}$ element, ... are pre-known values. The first communications device may perform, according to this characteristic and based on the received first signal, channel estimation on the radio channel that the received first signal passes through.

In a specific implementation process of step 301, optionally, K is a proper divisor except 1 of N.

In a specific implementation process of step 302, optionally, that the first communications device estimates the channel information of the radio channel according to the received first signal and the preset second sequence may specifically include:

It is assumed that a fourth sequence corresponding to the subcarriers occupied by the first signal is $\{D_0, D_1, D_2, \ldots, D_{N-1}\}$, so that the first communications device determines, according to at least an element $D_p$ of the fourth sequence, an element $B_p$ corresponding to the preset second sequence, an element $D_{p+q\times K}$ of the fourth sequence, and an element $B_{p+q\times K}$ of the second sequence, channel information of subcarriers whose serial numbers are p and p+q×K. p is a non-negative integer less than N, p+q×K is a non-negative integer less than N, and q is an integer except 0.

Further, the first communications device further estimates the channel information of the radio channel according to estimated channel information of at least two subcarriers.

It should be understood that in a specific implementation process, elements with an interval of K−1 elements in any third sequence are equivalent, so that elements with an interval of K−1 elements in the first sequence are a result obtained after a same value is acted on the preset second sequence. Further, elements with an interval of q×K−1 elements in the first sequence are also equivalent. It should be noted that p+q×K should be a positive integer that is not greater than N−1, and q is a positive integer. An example is used for description. Elements $A_p$ and $A_{p+K}$ in the first sequence are elements with an interval of K−1 elements, and the two elements respectively meet:

$$A_p = A_{Const} \times B_p \times C_{sp}; \text{ and}$$

$$A_{p+K} = A_{Const} \times B_{p+K} \times C_{s(p+K)}$$

In the foregoing formulas, $C_{sp} = C_{s(p+K)}$, and therefore the formulas may further be organized as:

$$A_p = A'_{Const} \times B_p; \text{ and}$$

$$A_{p+K} = A'_{Const} \times B_{p+K}, \text{ where}$$

$$A'_{Const} = A_{Const} \times C_{sp} = A_{Const} \times C_{s(p+K)}$$

It can be learned from the foregoing equations that the elements with an interval of K−1 elements in the first sequence have a simple correspondence with elements corresponding to the second sequence.

After the second signal that is transmitted by using the radio channel, becomes the first signal, and is received by the first communications device, the first communications device compares, with corresponding elements in the second sequence, elements with an interval of K−1 elements, or more commonly, elements with an interval of q×K−1 elements in the fourth sequence corresponding to the first signal, so as to estimate channel information of corresponding subcarriers.

In a specific implementation process, still further, the first communications device estimates the channel information of the radio channel according to channel information of at least two subcarriers. A specific estimation manner may be an interpolation method, so as to estimate, according to channel information of a small quantity of subcarriers, channel information of radio channels on all subcarriers occupied by the second signal.

It should be understood that the radio channel mentioned herein is specifically a radio channel occupied by the first communications device and the second communications device during transmission of the second signal, that is, the radio channel is corresponding to limited spectrum resources and time resources. It should be understood that information about the radio channel and that is estimated by the first communications device is specifically estimated channel information corresponding to a radio channel passed by the second signal during transmission.

In a specific implementation process, it should be understood that during channel information estimation, a larger quantity of available subcarriers generally indicates more accurate channel information obtained by means of estimation. Therefore, a preferred technical solution is: according to ceil(N/K) elements in the fourth sequence and corresponding elements in the second sequence, the first communications device estimates channel information of a corresponding subcarrier, and further estimates information about the radio channel, where the ceil(N/K) elements are elements with an interval of q×K−1 elements. In a specific implementation process, it should be understood that a larger quantity of subcarriers available during channel information estimation generally indicates more accurate channel information obtained by means of estimation. Therefore, if a possible quantity of to-be-transmitted states is M, when K=M, a maximum quantity, that is, ceil(N/M), of subcarriers may be used to perform channel estimation.

It should be understood that ceil represents rounding up, and N is a length of the first sequence, the second sequence, any third sequence, and the fourth sequence. An example is used for description.

It is assumed that N is 12 and K is 5, so that $C_{s1} = C_{s6} = C_{s11}$ in a corresponding third sequence whose serial number is s, and the first communications device may determine channel information of a corresponding subcarrier 1, subcarrier 6, and subcarrier 11 according to elements D1, D6, and D11 in the fourth sequence and corresponding elements B1, B6, and B11 in the second sequence, and further estimate information about the radio channel.

In a specific implementation process, when p is 0, with reference to that the elements $C_{si}$ whose serial number is i in the third sequence whose serial number is s in the state sequence set meets: $C_{si} = B_{Const} \times e^{(-j2\pi/K) \times s \times i}$, an operation performed when the first communications device performs channel estimation may further be simplified. Specifically, the state sequence set may be expressed as:

$$\{$$
$$\{1, 1, 1, \ldots, 1\};$$
$$\{1, e^{(-j2\pi/K)}, e^{(-j2\pi/K)\times 2}, \ldots, e^{(-j2\pi/K)\times(N-1)}\};$$
$$\{1, e^{(-j2\pi/K)\times 2}, e^{(-j2\pi/K)\times 4}, \ldots, e^{(-j2\pi/K)\times 2\times(N-1)}\};$$
$$\{1, e^{(-j2\pi/K)\times 3}, e^{(-j2\pi/K)\times 6}, \ldots, e^{(-j2\pi/K)\times 3\times(N-1)}\};$$
$$\ldots$$
$$\{1, e^{(-j2\pi/K)\times(M-1)}, e^{(-j2\pi/K)\times 2\times(M-1)}, \ldots, e^{(-j2\pi/K)\times(M-1)\times(N-1)}\};$$
$$\}$$

It can be learned, by observing the foregoing state sequence set, that the $0^{th}$ the $K^{th}, \ldots,$ and the $q\times K^{th}$ element in any third sequence in the set are all equal to 1. Therefore, the first communications device may select elements in these locations for channel estimation, thereby simplifying a design.

In a specific implementation process of step 303, optionally, that the first communications device determines, according to the channel information of the radio channel and the first signal, the information carried by the second signal may further include:

The first communications device equalizes the first signal according to channel information of the radio channel; the first communications device determines the third sequence in the state sequence set according to the equalized first signal and the second sequence; and the first communications device determines, according to the third sequence, a state value corresponding to the third sequence.

In conclusion, by using the technical solution provided in this embodiment of the present invention, the communications device at a receive end not only obtains channel information of a radio channel passed by a signal during transmission, but also obtains information added by the communications device at a transmit end into the signal, thereby improving use efficiency of antenna resources and energy.

It should be understood that in addition to a scenario of communication between two communications devices, the technical solution provided in this embodiment of the present invention may also be applied to a multi-user scenario. For example, in a scenario in which multiple second communications devices communicate with one communications device, different second communications devices use different preset second sequences and execute, according to respective preset second sequence, the technical solution provided in this embodiment of the present invention. Further, the multiple second communications devices may use same time-frequency domain resources to implement the foregoing technical solution.

Still further, the different preset second sequences used by the different second communications devices may be generated based on a same basic sequence. In an optional manner, it is assumed that the base sequence is $\{G_0, G_1, \ldots, G_{N-1}\}$, then any element $B_i$ in a preset second sequence $\{B_0, B_1, \ldots, B_{N-1}\}$ used by a second communications device meets: $B_i = e^{-j2\pi/N \times n\_cs \times i} \times G_i$ or $B_i = e^{j2\pi/N \times n\_cs \times i} \times G_i$, where $i=0, 1, \ldots, N-1$, n_cs is corresponding to the preset second sequence used by the second communications device, and further, n_cs is corresponding to a cyclic shift that is of a time domain signal of the preset second sequence used by the second communications device and that is relative to a time domain signal corresponding to the basic sequence. Preferably, n_cs is a non-negative integer that is not greater than K. Therefore, when the different second communications devices use different n_cs values that meet a condition, distinguishing between and multiplexing between the different second communications devices may be implemented, and a second signal sent by each second communications device also meets a characteristic of a controllable peak-to-average ratio.

It should be understood that if the different second communications devices use different n_cs values, it may be ensured that the different second communications devices send different second signals, thereby ensuring a relatively weak mutual interference between signals sent by the different second communications devices.

In a specific implementation process, different second communications devices use different second sequences. Therefore, when at least two second communications devices select a same third sequence from a state sequence set, corresponding first sequences determined by the second communications devices are also different. When receiving first signals sent by the different second communications devices, that is, second signals that are separately transmitted by using radio channels, the first communications device may still distinguish between different second communications devices. Therefore, distinguishing between and multiplexing between multiple second communications devices are implemented.

Embodiment 2

An embodiment of the present invention provides an information transmission method. Specifically, this embodiment of the present invention provides a signal sending method, so as to correspond to the information transmission method provided in Embodiment 1 of the present invention. In the method provided in this embodiment of the present invention, a second communications device sends, to a first communications device, a signal that carries to-be-transmitted information. The signal helps the first communications device obtain not only channel information of a radio channel passed by the signal, but also information carried by the signal. In addition, a peak-to-average ratio of the signal is controllable to the second communications device.

FIG. 4 shows a procedure of an information transmission method provided in an embodiment of the present invention. The procedure includes at least the following steps.

Step 401: The second communications device determines a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

In a specific implementation process, the second signal sent by the second communications device carries the to-be-transmitted information, and specifically, the to-be-transmitted information is corresponding to one of M state values, and M is a positive integer greater than 1. An example is used for description. A communications device at a transmit end expects to transmit either "acknowledgment" information or "negative acknowledgment" information to a communications device at a receive end, so that the communications device at a transmit end selects, from a predefined state set, a state element corresponding to the "acknowledgment" information or a state element corresponding to the "negative acknowledgment" information, and sends a signal corresponding to the state element to the communications device at a receive end.

In this embodiment of the present invention and another embodiment of the present invention, it should be understood that M is a positive integer not less than 2, that is, the to-be-transmitted information is one of at least two types of optional information. For example, the to-be-transmitted information is either the "acknowledgment" information or the "negative acknowledgment" information.

It should be understood that transmission of a radio signal needs to occupy time resources and frequency resources, and in a specific implementation process, the frequency resources occupied by the radio signal may be represented in a distributed manner, that is, the frequency resources occupied by the radio signal may be divided into multiple subcarriers. In this embodiment of the present invention, a set formed by the subcarriers is referred to as a subcarrier set. In the technical solution provided in this embodiment of the present invention, a sequence corresponding to a subcarrier set occupied by the second signal is defined as the first sequence.

In a specific implementation process, the first sequence corresponding to the subcarriers occupied by the second signal meets: the first sequence is directly proportional to the product of the preset second sequence and the third sequence in the state sequence set. Specifically, the second sequence is preset, that is, the second sequence is known by both the first communications device and the second communications device; and a method for enabling both the first communications device and the second communications device to know the second sequence may be that: the second sequence is determined by the first communications device and the second communications device by means of mutual communication before step 401 is performed, or is defaulted or predefined by the first communications device and the second communications device.

It should be understood that the first sequence is directly proportional to a product of the second sequence and the third sequence, that is, any element in the first sequence is directly proportional to a product of elements corresponding to the second sequence and the third sequence. The first sequence, the second sequence, and the third sequence have a same length.

In a specific implementation process, the state sequence set includes at least the M third sequences corresponding to the M state values. Specifically, to meet that the information carried by the second signal is one of the M state values, the state sequence set includes at least the M third sequences, so as to correspond to the M state values. Optionally, a quantity of the third sequences included in the state sequence set is greater than M; and further optionally, more than one third sequence is corresponding to one state value.

It should be understood that the state sequence set may further include another sequence. This is not limited in this embodiment of the present invention. To more clearly describe an idea embodied in this embodiment of the present invention, in this embodiment of the present invention, it is assumed that the $0^{th}$ sequence to the $(M-1)^{th}$ sequence in the state sequence set are the third sequences, and description is provided on this basis. In view of this, persons skilled in the art may easily extend the technical solution provided in this embodiment of the present invention to a scenario in which serial numbers of third sequences in a state sequence set are in another form, for example, a scenario in which the first sequence to the $M^{th}$ sequence in a state set are third sequences. Therefore, the assumption herein in this embodiment of the present invention should not be considered as a limitation to the technical solution provided in the present invention.

In a specific implementation process, any third sequence in the state sequence set is a complex exponential sequence with a linear phase, and elements with an interval of K−1 elements in any third sequence are equivalent. K is a positive integer less than a length of the third sequence, and K is greater than or equal to M.

It is worth noting that in this embodiment and another embodiment of the present invention, the complex exponential sequence with a linear phase $\{X_0, X_1, X_2, X_3, \ldots, X_i, \ldots\}$ is defined as:

$$X_i = X_{Const} \times e^{j \times g(i)}, \text{ where}$$

$X_i$ is an element whose serial number is i in the foregoing complex exponential sequence, and i is any non-negative integer less than the length of the sequence; $X_{Const}$ is a complex constant; and e is a natural base, j is an identifier of an imaginary number, g(i) is a linear function in which i is a variable, and a common g(i) may be expressed as:

g(i)=axi+b, where for a sequence, a and b are real constants.

Correspondingly, in this embodiment of the present invention, if it is assumed that the third sequence whose serial number is s in the state sequence set is $\{C_{s0}, C_{s1}, C_{s2}, \ldots, C_{s(N-1)}\}$, the third sequence meets:

$$C_{si} = C_{Cons} \times e^{j \times f(s) \times h(i)}, \text{ where}$$

$C_{si}$ is an element whose serial number is i in the third sequence whose serial number is s in the state sequence set; $C_{Const}$ is a complex constant that is constant in the $s^{th}$ sequence or is constant in the state sequence set; and e is a natural base, j is an identifier of an imaginary number, N is a length of the third sequence, h(i) is a linear function in which i is a variable, and f(s) is a function in which s is a variable. In a specific implementation process, f(s) is actually corresponding to a state value corresponding to the third sequence whose serial number is s. In a specific implementation process, the third sequence whose length is N is equivalent to a sequence that is obtained after a sequence whose length is K is cyclically expanded, that is, $C_{s(i+K)} = C_{si}$.

It is worth noting that N is also lengths of the first sequence and the second sequence.

Further, in a specific implementation process, elements with an interval of K−1 elements in any third sequence are equivalent, that is, $C_{si} = C_{s(i+K)}$, and (i+K) is a positive integer that is not greater than N−1. An example is used for further description. If K is 4, elements with an interval of three elements in any third sequence are equivalent. Therefore, for a sequence $\{C_{s0}, C_{s1}, C_{s2}, C_{s3}, C_{s4}, C_{s5}, C_{s6}, \text{ and } C_{s7}\}$, $C_{s1} = C_{s5}$. $C_{s1}$ and $C_{s5}$ have an interval of three elements, that is, $C_{s2}, C_{s3}, \text{ and } C_{s4}$.

Optionally, K is equal to M, that is, elements with an interval of M−1 elements in any third sequence are equivalent. This ensures that when there are M to-be-transmitted state values, third sequence values on subcarriers that have an interval of M−1 subcarriers are the same. Therefore, it may help the first communications device perform channel estimation based on the subcarriers on which a same third sequence value is acted.

It should be understood that in the technical solution provided in this embodiment of the present invention, the state sequence set is an abstract concept provided for persons skilled in the art to clearly understand a purpose of the present invention. Existence forms of the state sequence set and the third sequences in the state sequence set in the first communications device and/or the second communications device are not limited in this embodiment of the present invention. In a specific implementation process, each third sequence in the state sequence set may exist in a memory of a communications device in a form of a complete sequence, or only several adjacent elements in the third sequence are stored. During application, a complete third sequence may be generated by using the several adjacent elements. The memory may also store parameters of only one third sequence, such as an initial phase and/or a phase increment; and a complete third sequence is obtained by means of calculation according to the parameters.

Step 402: The second communications device sends the second signal to a first communications device.

According to the method provided in this embodiment of the present invention, in a time domain, the second signal is equivalent to a time domain signal that is corresponding to the preset second sequence and that is horizontally shifted in terms of time. Therefore, for the second communications device that sends the second signal, an appropriate second sequence may be preset to transmit information to the first communications device. The "appropriate" second sequence herein is a second sequence that has a corresponding time domain signal whose peak-to-average ratio is within a capability range of a radio frequency module of the second communications device. It is worth noting that the second sequence is a frequency domain sequence.

According to the method provided in this embodiment of the present invention, when the second communications device sends the second signal to the first communications device, information is transmitted to the first communications device. In addition, it can be learned, according to description in Embodiment 1 of the present invention, that when the second signal has the characteristic according to Embodiment 2 of the present invention and Embodiment 1 of the present invention, the first communications device may further conveniently obtain channel information of the radio channel by receiving the second signal (that is, the first signal) that is transmitted by using the radio channel. Further, because the second signal is obtained after the time domain signal corresponding to the preset second sequence is horizontally shifted, the peak-to-average ratio of the second signal may be determined by the preset second sequence. Specifically, the second communications device may select an appropriate second sequence according to a capability of a radio frequency module of the second communications device, so as to control the peak-to-average ratio of the second signal to be within an appropriate range.

In a specific implementation process, it is assumed that the first sequence is specifically $\{A_0, A_1, \ldots, A_{N-1}\}$, and $A_i$ is an element whose serial number is i in the first sequence; the second sequence is specifically $\{B_0, B_1, \ldots, B_{N-1}\}$, and $B_i$ is an element whose serial number is i in the second sequence; a third sequence whose serial number is s in the state sequence set is specifically $\{C_{s0}, C_{s1}, C_{s2}, \ldots, C_{s(N-1)}\}$, and $C_{si}$ is an element whose serial number is i in the third sequence whose serial number is s in the state sequence set; and i=0, 1, 2, ..., N−1, s=0, 1, ..., M−1, and N indicates a quantity of elements of the first sequence, the second sequence, or any third sequence in the state sequence set.

In a specific implementation process of step 401, optionally, that the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$A_i = A_{Const} \times B_i \times C_{si}$, where $A_{Const}$ is a complex constant except 0, such as 1, i=0, 1, 2, ..., N−1, and s=0, 1, 2, ..., M−1.

Optionally, the element whose serial number is i in the first sequence may further meet:

$A_i = A_{Const1} \times B_i \times C_{si} + A_{Const2}$, where both $A_{Const1}$ and $A_{Const2}$ are constants, and $A_{Const2}$ represents a direct current bias of the first sequence.

In a specific implementation process of step 401, optionally, that any third sequence in the M third sequences in the state sequence set is a complex exponential sequence with a linear phase, and elements with an interval of K elements in any third sequence are equivalent may further indicate:

the element whose serial number is i in the third sequence whose serial number is s in the first set meets:

$C_{si} = B_{Const} \times W^{f(s) \times i}$, where:

$B_{Const}$ is a complex constant except 0, such as 1, $W = e^{(-j2\pi/K)}$ or $W = e^{(+j2\pi/K)}$, e is a natural base, j is an imaginary unit, K is a positive integer less than N, and i=0, 1, 2, ..., N−1; and s=0, 1, ..., M−1, f(s) is a function of s, and f(s) is corresponding to a state value corresponding to the third sequence whose serial number is s.

According to this implementation, a conversion relationship between a time domain operation and a frequency domain operation is further considered. More specifically, a frequency-domain phase shift is corresponding to a time-domain time shift. For example, one signal occupies N subcarriers, and a value of a subcarrier whose serial number is k occupied by the signal is X(k), and k=0, 1, ..., N−1. After a phase shift occurs in the signal in the frequency domain, which is equivalent to that $e^{(-j*k*2\pi/N*n_0)}$ is acted on the signal, the value of the corresponding subcarriers whose serial number is k changes to $Y(k) = X(k) \ e^{(-j*k*2\pi/N*n_0)}$. Therefore, a time-domain signal value y(t) corresponding to $\{Y(k)\}$ is a cyclic shift of a time-domain signal value x(t) corresponding to $\{X(k)\}$, and y(t)=x(t−t0), where $t_0 = n_0/N*T$, and T is a period of a periodic function x(t). N is sequence lengths of $\{X(k)\}$ and $\{Y(k)\}$, $n_0$ is a real number, and optionally, $n_0 = N/K$, and K is an integer.

When the first sequence corresponding to the occupied subcarriers is directly proportional to the product of the preset second sequence and the third sequence, and the third sequence has the foregoing expression form, a time domain signal corresponding to the second signal is a cyclic shift of a time domain signal corresponding to the preset second sequence.

When the third sequence has the foregoing characteristic, in a specific implementation process, the second communications device may obtain a to-be-sent signal by performing a simple time domain shift on a time sequence corresponding to the preset second sequence. Therefore, operation complexity can be reduced, and a design of an algorithm used when the second communications device sends a signal can be simplified. In addition, when the second communications device sends the second signal, the peak-to-average ratio of the second signal is determined by the preset second sequence. Therefore, a peak-to-average ratio when the second communications device sends a signal is controllable.

Further optionally, the preset second sequence includes a sequence corresponding to an uplink reference signal in an LTE system, or a Zadoff-Chu (Zadoff-Chu) sequence. When the second sequence is considered as a frequency domain sequence, a time domain sequence converted from the second sequence may still maintain an advantage of a low peak-to-average ratio. Therefore, the second signal sent by the second communications device also has the advantage of the low peak-to-average ratio. This is significant for communications devices whose radio frequency capabilities are not strong or whose radio frequency modules have relatively weak capabilities, such as a handheld terminal and user equipment. That is, this helps decrease a peak-to-average ratio when the second communications device sends the first sequence, thereby reducing a performance requirement of a radio frequency module of the second communications device. Specifically, a requirement of power back-off value of a radio frequency part of the second communications device is reduced, that is, a requirement of a dynamic range of a power amplifier of the second communications device is reduced.

Alternatively, further optionally, the time domain sequence corresponding to the preset second sequence is a sequence that has a constant envelope characteristic. When the element whose serial number is i in the third sequence whose serial number is s in the state sequence set meets a form: $C_{si} = B_{Const} \times W^{f(s) \times i}$, the second signal is a time shift of the time domain sequence corresponding to the preset second sequence. Therefore, the second signal also has the constant envelope characteristic. Therefore, a requirement of a radio frequency capability of a communications device can be reduced.

In a specific implementation process of step 401, optionally, the element $C_{si}$ whose serial number is i in the third sequence whose serial number is s in the state sequence set meets: $C_{si}=B_{Const} \times W^{f(s) \times i}$, where one expression form of f(s) may be f(s)=s or f(s)=−s.

Specifically, the element $C_{si}$ whose serial number is i in the third sequence whose serial number is s in the state sequence set meets:

$$C_{si}=B_{Const} \times W^{s \times i}=B_{Const} \times e^{(-j2\pi/K) \times s \times i}$$

When the element whose serial number is i in the third sequence whose serial number is s in the state sequence set meets the foregoing condition, the state sequence set may be expressed as:

$$\{$$
$$\{1, 1, 1, \ldots, 1\};$$
$$\{1, e^{(-j2\pi/K)}, e^{(-j2\pi/K) \times 2}, \ldots, e^{(-j2\pi/K) \times (N-1)}\};$$
$$\{1, e^{(-j2\pi/K) \times 2}, e^{(-j2\pi/K) \times 4}, \ldots, e^{(-j2\pi/K) \times 2 \times (N-1)}\};$$
$$\{1, e^{(-j2\pi/K) \times 3}, e^{(-j2\pi/K) \times 6}, \ldots, e^{(-j2\pi/K) \times 3 \times (N-1)}\};$$
$$\ldots$$
$$\{1, e^{(-j2\pi/K) \times (M-1)}, e^{(-j2\pi/K) \times 2 \times (M-1)}, \ldots, e^{(-j2\pi/K) \times (M-1) \times (N-1)}\};$$
$$\}$$

It can be learned that a first element in any third sequence in the state sequence set is 1, so that it can be determined, with reference to the characteristic that elements with an interval of K−1 elements in the third sequence are equivalent, that regardless of a third sequence selected by the second communications device, the corresponding first element, K+1$^{th}$ element, 2K+1$^{th}$ element, . . . are pre-known values. The first communications device may perform, according to this characteristic and based on the received first signal, channel estimation on the radio channel that the received first signal passes through.

In a specific implementation process of step 401, optionally, K is a proper divisor except 1 of N. When K is the proper divisor except 1 of N, N elements in any third sequence in the state sequence set may be evenly divided into N/K groups, and all the groups include a same quantity of elements, that is, K elements. The first communications device may select, according to this characteristic, a first signal on subcarriers corresponding to one group of elements, so as to perform channel estimation. It should be understood that in addition to a scenario of communication between two communications devices, the technical solution provided in this embodiment of the present invention may also be applied to a multi-user scenario. For example, in a scenario in which multiple second communications devices communicate with one communications device, different second communications devices use different preset second sequences and execute, according to respective preset second sequence, the technical solution provided in this embodiment of the present invention. Further, the multiple second communications devices may use same time-frequency domain resources to implement the foregoing technical solution.

Still further, the different preset second sequences used by the different second communications devices may be generated based on a same basic sequence. In an optional manner, it is assumed that the base sequence is $\{G_0, G_1, \ldots, G_{N-1}\}$, then any element $B_i$ in a preset second sequence $\{B_0, B_1, \ldots, B_{N-1}\}$ used by a second communications device meets: $B_i=e^{-j2\pi/N \times n\_cs \times i} \times G_i$ or $B_i=e^{-j2\pi/N \times n\_cs \times i} \times G_i$, where i=0, 1, . . . , N−1, and n_cs is corresponding to the preset second sequence used by the second communications device. Preferably, n_cs is a nonnegative integer less than K. Therefore, when the different second communications devices use different n_cs values that meet a condition, a second signal sent by each second communications device also meets a characteristic of a controllable peak-to-average ratio. It should be understood that if the different second communications devices use different n_cs values, it may be ensured that the different second communications devices send different second signals, thereby ensuring a relatively weak mutual interference between signals sent by the different second communications devices.

In a specific implementation process, it should be understood that a larger quantity of subcarriers available during channel information estimation generally indicates more accurate channel information obtained by means of estimation. Therefore, if a possible quantity of to-be-transmitted states is M, when K=M, a maximum quantity, that is, ceil(N/M), of subcarriers may be used to perform channel estimation.

In conclusion, according to the method provided in this embodiment of the present invention, a second signal sent by a second communications device to a first communications device not only has an advantage of a controllable peak-to-average ratio, but also carries information to be sent to the first communications device, and helps the first communications device estimate channel information according to a received signal. Therefore, at least two signals that originally need to be sent are decreased to one signal, thereby improving usage efficiency of radio resources and energy.

Embodiment 3

To enable persons skilled in the art to more clearly understand the technical solutions provided in Embodiment 1 and Embodiment 2 of the present invention, in this embodiment of the present invention, an OFDM technology is used as a background for description of a technical solution provided in this embodiment of the present invention. Some specific parameters used in this embodiment of the present invention come from a Long Term Evolution (English: Long Term Evolution, LTE for short) system that uses the OFDM technology. However, according to this embodiment of the present invention, the method provided in this embodiment of the present invention is not limited to be applied to only the LTE system.

FIG. 5 shows a schematic diagram of an OFDM symbol (or an SC-FDMA (single carrier frequency division multiple access) symbol) in the LTE system. In the figure, one OFDM symbol occupies 12 subcarriers in a frequency domain and 66.7 us in a time domain. It should be understood that in LTE systems of different versions, frequency spacings occupied by subcarriers may be different. For example, in Release 8, a frequency spacing occupied by a subcarrier is 15 kHz, and in a future millimeter-wave-based LTE system, a frequency spacing occupied by a subcarrier may be larger. In addition, duration of one OFDM symbol in different releases may also be different.

In this embodiment of the present invention, it is considered that one OFDM symbol includes 12 sampling points in the time domain, that is, one OFDM symbol is corresponding to a sequence including 12 elements. In a specific implementation process, persons skilled in the art may also use more sampling points to indicate an OFDM symbol in the time domain. This is not limited in this embodiment of the present invention.

In this embodiment of the present invention, one OFDM symbol occupies 12 subcarriers in a frequency domain, and a preset second sequence is a sequence corresponding to an uplink reference signal in the LTE system. The sequence includes 12 elements and has a property similar to that of a Zadoff-Chu sequence, that is, both the sequence and a sequence corresponding to a Fourier transformation of the sequence have a characteristic of a low peak-to-average ratio.

In this embodiment of the present invention, the second communications device determines to-be-sent information, selects, from four states, one state corresponding to the to-be-sent information, and sends, according to the state, a signal corresponding to the state to the first communications device.

FIG. 6 shows a procedure of a method for communication between the first communications device and the second communications device based on the method provided in this embodiment of the present invention. The procedure includes the following steps.

Step 601: The second communications device determines a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

Correspondingly, in a scenario provided in this embodiment of the present invention, the information carried by the second signal is corresponding to one of four states, that is, M=4. A first sequence corresponding to 12 subcarriers occupied by the second signal meets: the first sequence is directly proportional to the product of the preset second sequence and the third sequence in the state sequence set. As described above, the preset second sequence is a sequence corresponding to an uplink reference signal in the LTE system, includes 12 elements. There are four candidate states, and correspondingly, the state sequence set includes at least 4 third sequences.

Elements with an interval of K−1 elements in any third sequence in the state sequence set are equivalent, and K≥M is met, so that K≥4. It is assumed that K=4 herein.

The third sequence in the state sequence set is a complex exponential sequence with a linear phase, and elements with an interval of three elements in any third sequence are equivalent, so that a preferred form of an element $C_{si}$ whose serial number is i in the third sequence $\{C_{s0}, C_{s1}, C_{s2}, C_{s3}, C_{s4}, C_{s5}, C_{s6}, C_{s7}, C_{s8}, C_{s9}, C_{s10}, C_{s11}\}$ whose serial number is s in the state sequence set is:

$$C_{si}=e^{(-j2\pi/4)\times s\times i}, \text{ where}$$

e is a natural base, j is an imaginary unit, i=0, 1, 2, . . . , 11, and s=0, 1, . . . , 3.

Therefore, it can be learned that the state sequence set is specifically:

{
{1, 1, 1, 1, 1, 1, 1, 1, 1, 1, 1, 1};
{1, −j, −1, +j, 1, −j, −1, +j, 1, −j, −1, +j};
{1, −1, 1, −1, 1, −1, 1, −1, 1, −1, 1, −1};
{1, +j, −1, −j, 1, +j, −1, −j, 1, +j, −1, −j};
}

In a specific implementation process, the first sequence is directly proportional to the product of the second sequence and the third sequence in the state sequence set. With reference to the scenario provided in this embodiment, a relationship met by the first sequence $\{A_0, A_1, \ldots, A_{11}\}$, the second sequence $\{B_0, B_1, \ldots, B_{11}\}$, and the third sequence $\{C_{s0}, C_{s1}, \ldots, C_{s11}\}$ whose serial number is s in the state sequence set may be:

For an element $A_i$ whose serial number is i in the first sequence, $$A_i=B_i\times C_{si}.$$

With reference to an expression form of any third sequence in the state sequence set and a relationship that is between a frequency domain sequence and a corresponding time domain sequence and that is described in Embodiment 1 and Embodiment 2 of the present invention, it can be learned that the second signal is obtained after a time domain signal corresponding to the second sequence is horizontally shifted, and a time-domain shift amount is related to a phase increment of the selected third sequence.

Specifically, for the scenario provided in this embodiment of the present invention, it is assumed that the time domain signal corresponding to the second sequence is b(t). It should be understood that b(t) is a signal obtained after an inverse discrete Fourier transformation is performed on the second sequence $\{B_0, B_1, \ldots, B_{11}\}$, and is specifically a continuous periodic signal. When the third sequence is the $0^{th}$ third sequence in the state sequence set, a time signal corresponding to the second signal is specifically b(t).

When the third sequence is the first third sequence in the state sequence set, the time domain signal corresponding to the second signal is specifically $b(t-t_0)$.

When the third sequence is the second third sequence in the state sequence set, the time domain signal corresponding to the second signal is specifically $b(t-2t_0)$.

When the third sequence is the third sequence in the state sequence set, the time domain signal corresponding to the second signal is specifically $b(t-3t_0)$.

$t_0=n_0/N*T$, and T is a period of a periodic function b(t). N is a length 12 of the second sequence. $n_0$ is a real number; and in this embodiment of the present invention, $n_0=3$.

It can be learned, based on further observation of the state sequence set, that elements with an interval of three elements in the state sequence set are equivalent. For example, $C_{11}$, $C_{15}$, and $C_{19}$ are equivalent elements. More particularly, $C_{s0}$, $C_{s4}$, and $C_{s8}$ are all 1, where s=0, 1, 2, 3. This characteristic may facilitate the first communications device in estimating the channel information of the radio channel, and details thereof are described below in this embodiment of the present invention.

Step 602: The second communications device sends the second signal to a first communications device.

In the technical solution provided in this embodiment of the present invention, the second communications device sends the second signal to the first communications device. It can be learned from the foregoing description that when the information carried by the second signal is different, but a corresponding time domain signal obtained after an inverse DFT transformation is performed is a time-domain cyclic shift of b(t). Therefore, a peak-to-average ratio of the second signal is determined by the sequence, and the peak-to-average ratio of the second signal is controllable. With reference to the scenario provided in this embodiment of the present invention, the preset second sequence is the sequence corresponding to the uplink reference signal in the LTE system, and the sequence has a characteristic similar to that of a Zadoff-Chu sequence, that is, the sequence has a characteristic of a low peak-to-average ratio. In addition, the sequence on which a Fourier transformation is performed also has the characteristic of a low peak-to-average ratio. Therefore, when the second communications device sends the second signal, the peak-to-average ratio may be maintained in relatively low state, thereby helping reduce a performance requirement of a radio frequency module of the second communications device.

Step 603: The first communications device receives a first signal that is sent by the second communications device and that is transmitted by using a radio channel, where information carried by a second signal that is corresponding to the first signal and that is not transmitted by using the radio channel is corresponding to one of M state values.

In a specific implementation process, under the action of the radio channel, the second signal sent by the second communications device to the first communications device is different from a corresponding signal received by the first communications device, that is, the first signal. A reason why the radio channel affects radio signal transmission is described in Embodiment 1 of the present invention, and details are not described herein again.

Step 604: The first communications device estimates channel information of the radio channel according to the first signal and the second sequence.

It is assumed that a fourth sequence corresponding to the subcarriers occupied by the first signal is $\{D_0, D_1, D_2, \ldots, D_{11}\}$, and a reference state sequence set is:

{
$\{1, 1, 1, 1, 1, 1, 1, 1, 1, 1, 1, 1\}$;
$\{1, -j, -1, +j, 1, -j, -1, +j, 1, -j, -1, +j\}$;
$\{1, -1, 1, -1, 1, -1, 1, -1, 1, -1, 1, -1\}$;
$\{1, +j, -1, -j, 1, +j, -1, -j, 1, +j, -1, -j\}$;
}

Though the first communications device does not determine information added by the second communications device into the second signal, that is, does not determine a third sequence corresponding to the second signal, it can be determined that elements with an interval of three elements in any third sequence are equivalent. The first communications device may select elements with an interval of three elements in the fourth sequence, and compare the selected elements with corresponding elements in the second sequence, so as to determine channel information of corresponding subcarriers. Further, an example is used for description.

The first communications device may select elements $D_2$, $D_6$, and $D_{10}$, in the fourth sequence, and compare the selected elements $D_2$, $D_6$, and $D_{10}$ and elements $B_2$, $B_6$, and $B_{10}$ in the second sequence, so as to obtain channel information of corresponding subcarriers whose serial numbers are 2, 6, and 10.

In a specific implementation process, preferably, the first communications device may select elements $D_0$, $D_4$, and $D_8$ in the first sequence, and compare the selected elements $D_0$, $D_4$, and $D_8$ and elements $B_0$, $B_4$, and $B_8$ in the second sequence, so as to obtain channel information of corresponding subcarriers whose serial numbers are 0, 4, and 8. Based on the state sequence set, it can be learned that elements whose serial numbers are 0, 4, and 8 in any third sequence in the state sequence set are 1. That is, for the first sequence $\{A_0, A_1, \ldots, A_{11}\}$ corresponding to the subcarriers occupied by the second signal, regardless of a third sequence selected by the second communications device from the state sequence set, $A_0=B_0$, $A_4=B_4$, and $A_8=B_8$. Correspondingly, the first communications device may select $D_0$, $D_4$, and $D_8$, and compare the selected $D_0$, $D_4$, and $D_8$ with corresponding $B_0$, $B_4$, and $B_8$, so as to determine channel information of corresponding subcarriers.

In a specific implementation process, after obtaining channel information of at least two subcarriers, the first communications device may further estimate, according to the channel information, channel information of all subcarriers occupied by the first signal. A specific implementation may be based on manners such as value interpolation. This is not limited in this embodiment of the present invention.

Step 605: The first communications device determines, according to the channel information of the radio channel and the first signal, the information carried by the second signal.

In a specific implementation process, the first communications device has obtained the channel information according to step 604, and further, the first communications device equalizes the received first signal according to the obtained channel information.

A purpose of the equalizing is to eliminate impact of a radio channel on a received signal as much as possible. That is, the first communications device equalizes a first signal, so that the first signal is more "like" a second signal, and information recovered by using the first signal is more reliable.

In a specific implementation process, the first communications device equalizes the first signal, and it is assumed that a fifth sequence corresponding to subcarriers occupied by the equalized signal is $\{D'_0, D'_1, D'_2, D'_{11}\}$. Further, the first communications device determines, according to the fifth sequence and the preset second sequence, a sixth sequence selected by the second communications device. An optional determining method includes: an element $C'_i$ whose serial number is i in the sixth sequence $\{C'_0, C'_1, \ldots, C'_{11}\}$ determined by the first communications device meets:

$C'_i=D'_i/B_i$, where i=0, 1, 2, . . . , 11. It should be understood that optionally, in this embodiment of the present invention, it is considered that any element in the second sequence has a non-zero value.

Further, the first communications device may determine, according to the sixth sequence $\{C'_0, C'_1, \ldots, C'_{11}\}$ determined by the first communications device, a third sequence corresponding to the information corresponding to the second signal sent by the second communications device. An optional determining method is: the first communications device performs a Fourier transformation analysis on the sixth sequence, so as to determine a phase increment between adjacent elements in $\{C'0, C'1, \ldots, C'11\}$, that is, determine a phase increment in a corresponding original third sequence $\{C_0, C_1, \ldots, C_{11}\}$. According to description of the element whose serial number is i in the third sequence whose serial number is s in the state sequence set in this embodiment of the present invention, that is, $C_{si}=e^{(-j2\pi/4) \times s \times i}$, it can be learned that when the phase increments of the adjacent elements in the third sequence are determined, which third sequence in the state sequence set is the third sequence can be determined.

It can be learned that according to the method provided in this embodiment of the present invention, the first communications device obtains channel information of a radio channel from a first signal, and also obtains information added by the second communications device into the first signal. For the second communications device, a peak-to-average ratio of a sent second signal does not become uncontrollable because carried information is different.

Technical solutions provided in Embodiment 1, Embodiment 2, and Embodiment 3 of the present invention may be specifically applied to the following application scenarios.

Scenario 1: The second communications device transmits a control channel and a reference signal in one symbol. The control channel may carry uplink control information of an ACK/NACK acknowledgment message, and the reference signal is an uplink demodulation reference signal. A quantity of states corresponding to the ACK/NACK acknowledgment message may be any one of 1, 2, or 3, or a value greater than 4. For example, one codeword (codeword) of a downlink data channel is corresponding to two states of the codeword: an ACK state and an NACK state. When a data block receiving error occurs, a receiving device feeds back NACK; or when a data block is correctly received, the receiving device feeds back ACK. When a downlink data channel has a maximum of two codewords, there may be a maximum of four states.

When the quantity of the states corresponding to the ACK/NACK acknowledgment message is 2, a quantity M of the state values in the state sequence set in the foregoing Embodiment 3 is 2. The elements with an interval of K−1 elements in any third sequence in the state sequence set are equivalent, and K≥M is met, so that K≥2. It is assumed that K=2 herein.

The third sequence in the state sequence set is a complex exponential sequence with a linear phase, and elements with an interval of one element in any third sequence are equivalent, so that a preferred form of an element $C_{si}$ whose serial number is i in the third sequence $\{C_{s0}, C_{s1}, C_{s2}, C_{s3}, C_{s4}, C_{s5}, C_{s6}, C_{s7}, C_{s8}, C_{s9}, C_{s10}, C_{s11}\}$ whose serial number is s in the state sequence set is:

$C_{si}=e^{(-j2\pi/2)\times s \times i}$ or $C_{si}=e^{(j2\pi/2)\times s \times i}$, where e is a natural base, j is an imaginary unit, i=0, 1, 2, . . . , 11, and s=0 or 1.

Correspondingly, the state sequence set may be expressed as:

$$\{ \\ \{1, 1, 1, 1, 1, 1, 1, 1, 1, 1, 1, 1\}; \\ \{1, -1, 1, -1, 1, -1, 1, -1, 1, -1, 1, -1\}; \\ \}$$

Another implementation step is the same as that in Embodiment 3.

Scenario 2: In a system based on single-carrier multiple access, filter single-carrier orthogonal frequency division multiplexing (English: Filter-Single Carrier-OFDM, Filter-SC-OFDM for short), or another technology such as single carrier frequency division multiple access (English: Single Carrier-Frequency Division Multiple Access, SC-FDMA for short), the second communications device transmits both control information and a reference signal in one symbol.

Scenario 3: The second communications device adds a rank indication message or any other type of control information in a control channel.

It should be understood that in the technical solutions provided in Embodiment 1, Embodiment 2, and Embodiment 3 of the present invention, the subcarriers occupied by the second signal may be some subcarriers in frequency resources occupied by a radio signal. The frequency resources occupied by the radio signal include at least one physical resource block, and each physical resource block is corresponding to L continuous subcarriers in a frequency domain. If all subcarriers in the frequency resources occupied by the radio signal are divided into p groups, where p≥2, optionally, all the p*k+$i^{th}$ subcarriers form the $i^{th}$ group, and herein, k=0, 1, . . . , N/p−1 and i=0, 1, 2, . . . , p−1. A subcarrier set occupied by the second signal of the second communications device may be the $i^{th}$ group in the p groups, and a value of i may be one of 0, 1, . . . , p−1. Another subcarrier set group in the p groups except the $i^{th}$ group may be used to transmit a sounding reference signal (English: Sounding Reference Signal, SRS for short) or one or a group of channels used by a user to transmit ACK/NACK. Generally, the subcarrier set occupied by the second signal is a set of N subcarriers evenly distributed at an interval, and the N subcarriers may not be continuous.

Embodiment 4

An embodiment of the present invention provides an information transmission apparatus, so as to implement the information transmission method provided in Embodiment 1 of the present invention. FIG. 7 shows a structural diagram of an information transmission apparatus according to an embodiment of the present invention. The information transmission apparatus includes a processor 701 and a transceiver 702.

The transceiver 702 is configured to receive a first signal that is sent by a second communications device and that is transmitted by using a radio channel, where information carried by a second signal that is corresponding to the first signal and that is not transmitted by using the radio channel is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

The processor 701 is configured to estimate channel information of the radio channel according to the first signal and the second sequence.

The processor 701 is further configured to determine, according to the channel information of the radio channel and the first signal, the information carried by the second signal.

In a specific implementation process, optionally, the first sequence is specifically $\{A_0, A_1, A_2, \ldots, A_{N-1}\}$, and $A_i$ is an element whose serial number is i in the first sequence; the second sequence is specifically $\{B_0, B_1, B_2, \ldots, B_{N-1}\}$, and $B_i$ is an element whose serial number is i in the second sequence; a third sequence whose serial number is s in the state sequence set is specifically $\{C_{s0}, C_{s1}, \ldots, C_{s(N-1)}\}$, and $C_{si}$ is an element whose serial number is i in the third sequence whose serial number is s in the state sequence set; and i=0, 1, 2, ..., N−1, s=0, 1, 2, ..., M−1, and N indicates a quantity of elements of the first sequence, the second sequence, or any third sequence in the state sequence set.

That the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, ..., N−1, and s=0, 1, 2, ..., M−1.

In a specific implementation process, optionally, that any third sequence in the M third sequences is a complex exponential sequence with a linear phase, and elements with an interval of K−1 elements in any third sequence are equivalent includes: the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W = e^{(-j2\pi/K)}$ or $W = e^{(+j2\pi/K)}$, e is a natural base, j is an imaginary unit, and K is a positive integer less than N;
i=0, 1, 2, ..., N−1;
s=0, 1, 2, ..., M−1; and
f(s) is a function of s, and f(s) is corresponding to a state value corresponding to the third sequence whose serial number is s.

In a specific implementation process, optionally, f(s) is specifically f(s)=s or f(s)=−s.

In a specific implementation process, optionally, the preset second sequence includes a subcarrier sequence corresponding to an uplink reference signal in an LTE system, or a Zadoff-Chu sequence.

In a specific implementation process, optionally, K is a proper divisor except 1 of N.

In a specific implementation process, optionally, that the processor 701 is configured to estimate channel information of the radio channel according to the first signal specifically includes:

the processor 701 determines, according to at least an element $D_p$ of a fourth sequence corresponding to subcarriers occupied by the first signal, $B_p$ of the second sequence, an element $D_{p+q \times K}$ of the fourth sequence, and an element $B_{p+q \times K}$ of the second sequence, channel information of a subcarrier whose serial number is p and a subcarrier whose serial number is p+q×K, where the fourth sequence is {$D_0$, $D_1$, $D_2$, ..., $D_{N-1}$}, and p is a non-negative integer less than N, p+q×K is a non-negative integer less than N, and q is an integer except 0; and the processor 701 estimates the channel information of the radio channel according to channel information of at least two subcarriers.

In a specific implementation process, optionally, p is 0.

In a specific implementation process, optionally, that the processor 701 is configured to determine, according to the channel information of the radio channel and the first signal, the information carried by the second signal includes:

the processor 701 equalizes the first signal according to channel information of the radio channel;

the processor 701 further determines the third sequence in the state sequence set according to the equalized first signal and the second sequence; and the processor 701 determines, according to the third sequence, a state value corresponding to the third sequence.

According to the technical solution provided in this embodiment of the present invention, in the technical solution provided in this embodiment of the present invention, the information transmission apparatus not only obtains, according to the received first signal, the channel information of the radio channel passed by the second signal, but also processes the first signal according to the channel information of the radio channel, so that the information added by the second communications device into the second signal can be determined more reliably. That is, both an estimate of the channel information of the radio channel and the information added by the second communications device into the second signal are obtained by detecting the first signal. In this process, no extra energy is wasted.

Embodiment 5

Figure 8:
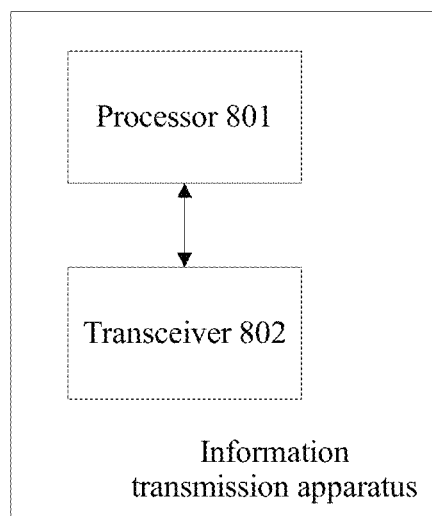
FIG. 8 shows a structural diagram of an information transmission apparatus according to an embodiment of the present invention.

An embodiment of the present invention provides an information transmission apparatus, so as to implement the information transmission method provided in Embodiment 2 of the present invention. FIG. 8 shows a structural diagram of an information transmission apparatus according to an embodiment of the present invention. The information transmission apparatus includes a processor 801 and a transceiver 802.

The processor 801 is configured to determine a to-be-sent second signal, where information carried by the second signal is corresponding to one of M state values, and a first sequence corresponding to subcarriers occupied by the second signal meets: the first sequence is directly proportional to a product of a preset second sequence and a third sequence in a state sequence set, where the state sequence set includes at least M third sequences corresponding to the M state values, any third sequence in the M third sequences is a complex exponential sequence with a linear phase, and elements with an interval of K−1 elements in any third sequence are equivalent, where K and M meet K≥M, M is a positive integer greater than 1, and K is a positive integer less than a length of the third sequence.

The transceiver 802 sends the second signal to a first communications device.

In a specific implementation process, optionally, the first sequence is specifically {$A_0$, $A_1$, $A_2$, ..., $A_{N-1}$}, and $A_i$ is an element whose serial number is i in the first sequence; the second sequence is specifically {$B_0$, $B_1$, $B_2$, ..., $B_{N-1}$}, and $B_i$ is an element whose serial number is i in the second sequence; a third sequence whose serial number is s in the state sequence set is specifically {$C_{s0}$, $C_{s1}$, ..., $C_{s(N-1)}$}, and $C_{si}$ is an element whose serial number is i in the third sequence whose serial number is s in the state sequence set; and i=0, 1, 2, ..., N−1, s=0, 1, 2, ..., M−1, and N indicates a quantity of elements of the first sequence, the second sequence, or any third sequence in the state sequence set.

That the first sequence is directly proportional to a product of a preset second sequence and a third sequence in a state sequence set includes:

the first sequence is directly proportional to a product of the preset second sequence and the third sequence whose serial number is s in the state sequence set; and the element whose serial number is i in the first sequence meets:

$$A_i = A_{Const} \times B_i \times C_{si}, \text{ where}$$

$A_{Const}$ is a complex constant except 0, i=0, 1, ..., N−1, and s=0, 1, 2, ..., M−1.

In a specific implementation process, optionally, that any third sequence in the M third sequences is a complex exponential sequence with a linear phase, and elements with an interval of K−1 elements in any third sequence are equivalent includes:

the element whose serial number is i in the third sequence whose serial number is s in the state sequence set meets:

$$C_{si} = B_{Const} \times W^{f(s) \times i}, \text{ where:}$$

$B_{Const}$ is a complex constant except 0;
$W=e^{(-j2\pi/K)}$ or $W=e^{(+j2\pi/K)}$, e is a natural base, j is an imaginary unit, and K is a positive integer less than N;
i=0, 1, 2, ..., N−1;
s=0, 1, 2, ..., M−1; and
f(s) is a function of s, and f(s) is corresponding to a state value corresponding to the third sequence whose serial number is s.

In a specific implementation process, optionally, f(s) is specifically f(s)=s or f(s)=−s.

In a specific implementation process, optionally, the preset second sequence includes a subcarrier sequence corresponding to an uplink reference signal in an LTE system, or a Zadoff-Chu sequence.

In a specific implementation process, optionally, K is a proper divisor except 1 of N.

According to the apparatus provided in this embodiment of the present invention, a second signal sent by the information transmission apparatus to a first communications device not only has an advantage of a controllable peak-to-average ratio, but also carries information to be sent to the first communications device, and helps the first communications device estimate channel information according to a received signal. Therefore, at least two times of signal sending that are originally required are decreased to one time, thereby improving usage efficiency of radio resources and energy.

Persons skilled in the art should understand that sequences or signals mentioned in the embodiments of the present invention are expressed in a plural form for ease of description. In specific application, an optional signal sending manner of a second communications device is: The second communications device converts, based on an inverse fast Fourier transformation algorithm, first sequences expressed in a plural form into time domain signals, that is, second signals. The second communications device further maps real parts of the second signals into an in-phase tunnel of a sending tunnel, and maps imaginary parts of the second signals into an orthogonal tunnel of the sending tunnel, and further obtains radio frequency signals by performing processing such as an up-conversion process on the mapped signals, and sends the radio frequency signals. In specific application, an optional signal receiving manner of a first communications device is: The first communications device performs operations such as up-conversion and filtering on received signals, moves the received signals to first signals represented by in-phase signals and orthogonal signals, and then performs further processing.

Persons of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific embodiments of the present invention, but are not intended to limit the protection scope of the present invention. Any modification or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
receiving, by a first communications device, a first signal from a second communications device using a radio channel, wherein a second signal, corresponding to the received first signal, is transmitted by the second communications device to the first communications device using the radio channel, wherein information carried by the second signal corresponds to one of M state values, wherein a first sequence corresponding to one or more subcarriers occupied by the second signal is directly proportional to a product of a preset second sequence and a third sequence in a state sequence set, wherein the preset second sequence is used, by the second communications device, to control a peak-to-average ratio of the second signal, wherein the peak-to-average ratio of the second signal is determined by the preset second sequence, wherein the preset second sequence is known to both the first and second communications devices, wherein the state sequence set comprises at least M sequences corresponding to the M state values, wherein any sequence in the M sequences is a complex exponential sequence with a linear phase, wherein elements in any sequence in the M sequences with an interval of K−1 elements are equivalent, and wherein K≥M, M is a positive integer greater than 1, and K is a positive integer less than a length of the third sequence N;
estimating, by the first communications device, channel information of the radio channel according to the received first signal and the preset second sequence; and
in response to estimating the channel information of the radio channel, determining, by the first communications device and according to the estimated channel information of the radio channel and the received first signal, the information carried by the second signal;
wherein the state sequence set includes:
$\{$
$\{1, 1, 1, \ldots, 1\}$
$\{1, e^{(-j2\pi/K)}, e^{(-j2\pi/K) \times 2}, \ldots, e^{(-j2\pi/K) \times (N-1)}\};$
$\{1, e^{(-j2\pi/K) \times 2}, e^{(-j2\pi/K) \times 4}, \ldots, e^{(-j2\pi/K) \times 2 \times (N-1)}\};$
$\{1, e^{(-j2\pi/K) \times 3}, e^{(-j2\pi/K) \times 6}, \ldots, e^{(-j2\pi/K) \times 3 \times (N-1)}\};$
$\ldots$
$\{1, e^{(-j2\pi/K) \times (M-1)}, e^{(-j2\pi/K) \times 2 \times (M-1)}, \ldots, e^{(-j2\pi/K) \times (M-1) \times (N-1)}\};$
$\}$.

2. The method according to claim 1, wherein the first sequence is $\{A_0, A_1, A_2, \ldots, A_{N-1}\}$, and $A_i$ is an element with a serial number of i in the first sequence; wherein the second sequence is $\{B_0, B_1, B_2, \ldots, B_{N-1}\}$, and $B_i$ is an element with a serial number of i in the second sequence; wherein a sequence with a serial number of s in the state sequence set is $\{C_{s0}, C_{s1}, \ldots, C_{s(N-1)}\}$, and $C_{si}$ is an element with a serial number of i in the sequence with the serial number of s in the state sequence set; wherein i=0, 1, 2, …, N−1, s=0, 1, 2, …, M−1, and each sequence of the first sequence, the second sequence, and any sequence in the state sequence set has N elements; and
wherein the first sequence is directly proportional to a product of a preset second sequence and a third sequence in a state sequence set comprises:
the first sequence is directly proportional to a product of the preset second sequence and the sequence with the serial number of s in the state sequence set, wherein $A_i = A_{Const} \times B_i \times C_{si}$, $A_{Const}$ being a first complex constant except 0.

3. The method according to claim 2, wherein any sequence in the M sequences is a complex exponential sequence with a linear phase, and elements in any sequence in the M sequences with an interval of K−1 elements are equivalent comprises:
$C_{si} = B_{Const} \times W^{f(s) \times i}$, wherein:
$B_{Const}$ is a second complex constant except 0;
$W = e^{(-j2\pi/K)}$ or $W = e^{(+j2\pi/K)}$, e is a natural base, j is an imaginary unit, and K is a positive integer less than N; and
f(s) is a function of s, and f(s) corresponds to a state value corresponding to the sequence with the serial number of s.

4. The method according to claim 3, wherein f(s)=s or f(s)=−s.

5. The method according to claim 2, wherein K is a proper divisor of N except 1.

6. The method according to claim 2, wherein estimating, by the first communications device, channel information of the radio channel according to the received first signal and the preset second sequence comprises:
estimating, by the first communications device, channel information of the radio channel according to at least an element $D_p$ of a fourth sequence corresponding to one or more subcarriers occupied by the first signal, $B_p$ of the preset second sequence, an element $D_{p+q \times K}$ of the fourth sequence, and an element $B_{p+q \times K}$ of the preset second sequence, wherein the fourth sequence is $\{D_0, D_1, D_2, \ldots, D_{N-1}\}$, p is a non-negative integer less than N, p+q×K is a non-negative integer less than N, and q is an integer except 0.

7. The method according to claim 6, wherein p is 0.

8. The method according to claim 2, wherein determining, by the first communications device and according to the estimated channel information of the radio channel and the received first signal, the information carried by the second signal comprises:
equalizing, by the first communications device, the received first signal according to the estimated channel information of the radio channel;
determining, by the first communications device, the third sequence in the state sequence set according to the equalized first signal and the preset second sequence; and
determining, by the first communications device and according to the determined third sequence, a state value corresponding to the determined third sequence.

9. The method according to claim 1, wherein the preset second sequence comprises at least one of a subcarrier sequence corresponding to an uplink reference signal in a Long Term Evolution (LTE) system, a Zadoff-Chu sequence, and a sequence obtained after a Zadoff-Chu sequence is cyclically expanded or truncated.

10. The method according to claim 1, wherein the preset second sequence comprises a Zadoff-Chu sequence.

11. An information transmission apparatus, comprising at least one processor and a transceiver, wherein:
the transceiver is configured to receive a first signal from a communications device using a radio channel, wherein a second signal, corresponding to the received first signal, is transmitted by the communications device to the information transmission apparatus using the radio channel, wherein information carried by the second signal corresponds to one of M state values, wherein a first sequence corresponding to one or more subcarriers occupied by the second signal is directly proportional to a product of a preset second sequence and a third sequence in a state sequence set, wherein the preset second sequence is used, by the communications device, to control a peak-to-average ratio of the second signal, wherein the peak-to-average ratio of the second signal is determined by the preset second sequence, wherein the preset second sequence is known to both the information transmission apparatus and the communications device, wherein the state sequence set comprises at least M sequences corresponding to the M state values, wherein any sequence in the M sequences is a complex exponential sequence with a linear phase, wherein elements in any sequence in the M sequences with an interval of K−1 elements are equivalent, and wherein K≥M, M is a positive integer greater than 1, and K is a positive integer less than a length of the third sequence N;

the at least one processor is configured to estimate channel information of the radio channel according to the received first signal and the preset second sequence; and the at least one processor is further configured to in response to estimating the channel information of the radio channel, determine, according to the estimated channel information of the radio channel and the received first signal, the information carried by the second signal;

wherein the state sequence set includes:

$$\{$$
$$\{1, 1, 1, \ldots, 1\}$$
$$\{1, e^{(-j2\pi/K)}, e^{(-j2\pi/K)\times 2}, \ldots, e^{(-j2\pi/K)\times(N-1)}\};$$
$$\{1, e^{(-j2\pi/K)\times 2}, e^{(-j2\pi/K)\times 4}, \ldots, e^{(-j2\pi/K)\times 2\times(N-1)}\};$$
$$\{1, e^{(-j2\pi/K)\times 3}, e^{(-j2\pi/K)\times 6}, \ldots, e^{(-j2\pi/K)\times 3\times(N-1)}\};$$
$$\ldots$$
$$\{1, e^{(-j2\pi/K)\times(M-1)}, e^{(-j2\pi/K)\times 2\times(M-1)}, \ldots, e^{(-j2\pi/K)\times(M-1)\times(N-1)}\};$$
$$\}.$$

12. The apparatus according to claim 11, wherein the first sequence is $\{A_0, A_1, A_2, \ldots, A_{N-1}\}$, and $A_i$ is an element with a serial number of i in the first sequence; wherein the second sequence is $\{B_0, B_1, B_2, \ldots, B_{N-1}\}$, and $B_i$ is an element with a serial number of i in the second sequence; wherein a sequence with a serial number of s in the state sequence set is $\{C_{s0}, C_{s1}, C_{s(N-1)}\}$, and $C_{si}$ is an element with a serial number of i in the sequence with the serial number of s in the state sequence set; wherein i=0, 1, 2, . . . , N−1, s=0, 1, 2, . . . , M−1, and each sequence of the first sequence, the second sequence, and any sequence in the state sequence set has N elements; and wherein the first sequence is directly proportional to a product of a preset second sequence and a third sequence in a state sequence set comprises:

the first sequence is directly proportional to a product of the preset second sequence and the sequence with the serial number of s in the state sequence set, wherein $A_i = A_{Const} \times B_i \times C_{si}$, $A_{Const}$ being a first complex constant except 0.

13. The apparatus according to claim 12, wherein any sequence in the M sequences is a complex exponential sequence with a linear phase, and elements in any sequence in the M sequences with an interval of K−1 elements are equivalent comprises:

$C_{si} = B_{Const} \times W^{f(s) \times i}$, wherein:

$B_{Const}$ is a second complex constant except 0;

$W = e^{(-j2\pi/K)}$ or $W = e^{(+j2\pi/K)}$, e is a natural base, j is an imaginary unit, and K is a positive integer less than N; and f(s) is a function of s, and f(s) corresponds to a state value corresponding to the sequence with the serial number of s.

14. The apparatus according to claim 13, wherein f(s)=s or f(s)=−s.

15. The apparatus according to claim 12, wherein K is a proper divisor of N except 1.

16. The apparatus according to claim 12, wherein the at least one processor is configured to estimate channel information of the radio channel according to the received first signal and the preset second sequence comprises:

the at least one processor is configured to estimate channel information of the radio channel according to at least an element $D_p$ of a fourth sequence corresponding to one or more subcarriers occupied by the first signal, $B_p$ of the preset second sequence, an element $D_{p+q\times K}$ of the fourth sequence, and an element $B_{p+q\times K}$ of the preset second sequence, wherein the fourth sequence is $\{D_0, D_1, D_2, \ldots, D_{N-1}\}$, p is a non-negative integer less than N, p+q×K is a non-negative integer less than N, and q is an integer except 0.

17. The apparatus according to claim 16, wherein p is 0.

18. The apparatus according to claim 12, wherein the at least one processor is configured to determine, according to the estimated channel information of the radio channel and the received first signal, the information carried by the second signal comprises:

the at least one processor is configured to equalize the received first signal according to the estimated channel information of the radio channel;

the at least one processor is further configured to determine the third sequence in the state sequence set according to the equalized first signal and the preset second sequence; and the at least one processor is further configured to determine, according to the determined third sequence, a state value corresponding to the determined third sequence.

19. The apparatus according to claim 11, wherein the preset second sequence comprises at least one of a subcarrier sequence corresponding to an uplink reference signal in a Long Term Evolution (LTE) system, a Zadoff-Chu sequence, and a sequence obtained after a Zadoff-Chu sequence is cyclically expanded or truncated.

* * * * *